US009633385B1

(12) United States Patent
Ganjoo

(10) Patent No.: US 9,633,385 B1
(45) Date of Patent: Apr. 25, 2017

(54) FINANCIAL MANAGEMENT SYSTEM CATEGORIZATION UTILIZING IMAGE OR VIDEO ACQUIRED WITH MOBILE COMMUNICATION DEVICE

(75) Inventor: Afshin Ganjoo, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 879 days.

(21) Appl. No.: 13/361,130

(22) Filed: Jan. 30, 2012

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0601* (2013.01)

(58) Field of Classification Search
CPC .......................................... G06Q 30/00–30/08
USPC ............................................... 705/26.1–27.2
See application file for complete search history.

(56) References Cited

U.S. PATENT DOCUMENTS

| | | | |
|---|---|---|---|
| 5,490,217 | A | 2/1996 | Wang et al. |
| 5,914,472 | A | 6/1999 | Foladare et al. |
| 6,038,552 | A | 3/2000 | Fleischl et al. |
| 6,189,781 | B1 | 2/2001 | Yoshinaga et al. |
| 6,202,052 | B1 | 3/2001 | Miller |
| 6,460,763 | B1 | 10/2002 | Yoshinaga et al. |
| 6,490,601 | B1 | 12/2002 | Markus et al. |
| 6,583,794 | B1 | 6/2003 | Wattenberg |
| 6,996,546 | B1 | 2/2006 | Giles et al. |
| 7,249,092 | B2 | 7/2007 | Dunn et al. |
| 7,366,684 | B1 | 4/2008 | Douglas |
| 7,600,673 | B2 | 10/2009 | Stoutenburg et al. |
| 7,778,895 | B1 | 8/2010 | Baxter et al. |
| 7,848,765 | B2 | 12/2010 | Phillips et al. |
| 7,970,669 | B1 * | 6/2011 | Santos ........................... 705/30 |

(Continued)

FOREIGN PATENT DOCUMENTS

| | | |
|---|---|---|
| JP | 2006260521 A | 9/2006 |
| JP | 2006268302 A | 10/2006 |

(Continued)

OTHER PUBLICATIONS

Office Action dated Dec. 1, 2011 in U.S. Appl. No. 12/545,525, filed Aug. 21, 2009, (13 pages).

(Continued)

*Primary Examiner* — Michael Misiaszek
(74) *Attorney, Agent, or Firm* — Vista IP Law Group LLP

(57) ABSTRACT

Systems, methods and computer program products for item categorization. A mobile communication device such as a smartphone is utilized by a consumer to acquire an image or video of a barcode or other machine readable indicia associated with an item. The image or video is processed to identify read or scan the barcode to determine corresponding numerical data or a code, which is used to identify the specific item selected by the consumer for purchase from a merchant. The identified specific item (or image or video or associated data) is transmitted from the mobile communication device to a computer hosting a financial management system, which categorizes the item and update or generates financial reports or summaries reflecting the recent categorization data. Reports or summaries such as category or item-based budget reports can be transmitted to and displayed on a screen of the mobile communication device.

27 Claims, 18 Drawing Sheets

(56) References Cited

U.S. PATENT DOCUMENTS

| | | | |
|---|---|---|---|
| 7,974,899 | B1 | 7/2011 | Prasad et al. |
| 8,418,920 | B2 | 4/2013 | Lieberman et al. |
| 8,538,827 | B1 | 9/2013 | Dryer et al. |
| 8,857,713 | B2 | 10/2014 | Lieberman et al. |
| 2002/0194079 | A1 | 12/2002 | Kimble |
| 2003/0126100 | A1 | 7/2003 | Chithambaram |
| 2003/0197058 | A1 | 10/2003 | Benkert et al. |
| 2004/0031856 | A1 | 2/2004 | Atsmon et al. |
| 2004/0039694 | A1 | 2/2004 | Dunn et al. |
| 2006/0059085 | A1 | 3/2006 | Tucker |
| 2007/0078760 | A1 | 4/2007 | Conaty et al. |
| 2007/0106558 | A1 | 5/2007 | Mitchell et al. |
| 2007/0149252 | A1 | 6/2007 | Jobs et al. |
| 2008/0109355 | A1 | 5/2008 | Dutta et al. |
| 2008/0237336 | A1 | 10/2008 | Bates et al. |
| 2008/0249984 | A1 | 10/2008 | Coimbatore et al. |
| 2009/0037461 | A1 | 2/2009 | Rukonic et al. |
| 2009/0076896 | A1 | 3/2009 | DeWitt et al. |
| 2009/0240605 | A1 | 9/2009 | Rukonic et al. |
| 2009/0286553 | A1* | 11/2009 | Northway et al. ......... 455/456.3 |
| 2010/0104078 | A1 | 4/2010 | Henry et al. |
| 2010/0268629 | A1* | 10/2010 | Ross et al. ...................... 705/35 |
| 2010/0312684 | A1 | 12/2010 | Kemper et al. |
| 2010/0312707 | A1* | 12/2010 | Das et al. ........................ 705/64 |
| 2011/0125643 | A1 | 5/2011 | Cameo et al. |
| 2011/0225084 | A1 | 9/2011 | Holt |
| 2012/0023011 | A1 | 1/2012 | Hurwitz et al. |
| 2012/0197773 | A1 | 8/2012 | Grigg et al. |
| 2012/0215669 | A1 | 8/2012 | Lieberman et al. |
| 2012/0245989 | A1 | 9/2012 | Kakrla et al. |
| 2013/0066750 | A1* | 3/2013 | Siddique et al. ............ 705/27.2 |
| 2013/0138656 | A1* | 5/2013 | Wheaton ...................... 707/740 |

FOREIGN PATENT DOCUMENTS

| | | | |
|---|---|---|---|
| JP | 2007011560 | A | 1/2007 |
| JP | 2007034916 | A | 2/2007 |
| JP | 2007328549 | A | 12/2007 |
| JP | 2008077245 | A | 4/2008 |
| JP | 2010009758 | A | 1/2010 |
| JP | 2010128964 | A | 6/2010 |
| KR | 1020070005407 | A | 1/2007 |

OTHER PUBLICATIONS

Amendment filed Feb. 23, 2012 in U.S. Appl. No. 12/545,525, filed Aug. 21, 2009, (12 pages).
Interview Summary dated Feb. 27, 2012 in U.S. Appl. No. 12/545,525, filed Aug. 21, 2009, (3 pages).
Interview Summary dated Oct. 15, 2012 in U.S. Appl. No. 12/545,525, filed Aug. 21, 2009, (2 pages).
Final Office Action dated Oct. 15, 2012 in U.S. Appl. No. 12/545,525, filed Aug. 21, 2009, (16 pages).
Amendment filed Feb. 15, 2013 in U.S. Appl. No. 12/545,525, filed Aug. 21, 2009, (17 pages).
Interview Summary dated Oct. 10, 2013 in U.S. Appl. No. 12/545,525, filed Aug. 21, 2009, (2 pages).
Office Action dated Oct. 11, 2013 in U.S. Appl. No. 12/545,525, filed Aug. 21, 2009, (15 pages).
Amendment filed Apr. 11, 2014 in U.S. Appl. No. 12/545,525, filed Aug. 21, 2009, (24 pages).
Office Action dated Aug. 1, 2012 in U.S. Appl. No. 13/030,983, filed Feb. 18, 2011, (15 pages).
Interview Summary dated Nov. 6, 2012 in U.S. Appl. No. 13/030,983, filed Feb. 18, 2011, (3 pages).
Amendment dated Nov. 14, 2012 in U.S. Appl. No. 13/030,983, filed Feb. 18, 2011, (16 pages).
Final Office Action dated Feb. 27, 2013 in U.S. Appl. No. 13/030,983, filed Feb. 18, 2011, (20 pages).
Amendment filed May 24, 2013 in U.S. Appl. No. 13/030,983, filed Feb. 18, 2011, (18 pages).
Office Action dated Aug. 14, 2012 in U.S. Appl. No. 13/031,023, filed Feb. 18, 2011, (7 pages).
Amendment filed Nov. 14, 2012 in U.S. Appl. No. 13/031,023, filed Feb. 18, 2011, (12 pages).
Notice of Allowance dated Dec. 10, 2012 in U.S. Appl. No. 13/031,023, filed Feb. 18, 2011, (7 pages).
Office Action dated Oct. 28, 2013 in U.S. Appl. No. 13/863,289, filed Apr. 15, 2013, (9 pages).
Amendment filed Jan. 10, 2014 in U.S. Appl. No. 13/863,289, filed Apr. 15, 2013, (10 pages).
Final Office Action dated Feb. 26, 2014 in U.S. Appl. No. 13/863,289, filed Apr. 15, 2013, (10 pages).
Amendment filed Apr. 28, 2014 in U.S. Appl. No. 13/863,289, filed Apr. 15, 2013, (7 pages).
Office Action dated Oct. 17, 2012 in U.S. Appl. No. 13/098,137, filed Apr. 29, 2011, (25 pages).
Notice of Allowance dated May 7, 2013 in U.S. Appl. No. 13/098,137, filed Apr. 29, 2011, (11 pages).
Office Action dated Oct. 17, 2012 in U.S. Appl. No. 13/097,946, filed Apr. 29, 2011, (21 pages).
Amendment filed Feb. 19, 2013 in U.S. Appl. No. 13/097,946, filed Apr. 29, 2011, (20 pages).
Final Office Action dated Apr. 3, 2013 in U.S. Appl. No. 13/097,946, filed Apr. 29, 2011, (30 pages).
Amendment filed Jun. 19, 2013 in U.S. Appl. No. 13/097,946, filed Apr. 29, 2011, (22 pages).
Office Action dated Jul. 29, 2013 in U.S. Appl. No. 13/907,659, filed May 31, 2013, (8 pages).
Amendment filed Nov. 29, 2013 in U.S. Appl. No. 13/907,659, filed May 31, 2013, (7 pages).
Final Office Action dated Dec. 24, 2013 in U.S. Appl. No. 13/907,659, filed May 31, 2013, (10 pages).
Amendment filed Apr. 24, 2014 in U.S. Appl. No. 13/907,659, filed May 31, 2013, (6 pages).
PCT International Search Report for PCT/US2011/026330, Applicant: Intuit Inc., Form PCT/ISA/210 and 220, dated Feb. 8, 2012 (5 pages).
PCT Written Opinion of the International Search Authority for PCT/US2011/026330, Applicant: Intuit Inc., Form PCT/ISA/237, dated Feb. 8, 2012 (5 pages).
PCT International Search Report for PCT/US2011/026340, Applicant: Intuit Inc., Form PCT/ISA/210 and 220, dated Feb. 28, 2012 (5 pages).
PCT Written Opinion of the International Search Authority for PCT/US2011/026340, Applicant: Intuit Inc., Form PCT/ISA/237, dated Feb. 28, 2012 (9 pages).
Office Action dated Feb. 3, 2012 in U.S. Appl. No. 12/710,977, filed Feb. 23, 2010, (34 pages).
Amendment filed Jun. 4, 2012 in U.S. Appl. No. 12/710,977, filed Feb. 23, 2010, (15 pages).
Final Office Action dated Nov. 26, 2012 in U.S. Appl. No. 12/710,977, filed Feb. 23, 2010, (17 pages).
Amendment filed May 24, 2014 in U.S. Appl. No. 12/710,977, filed Feb. 23, 2010, (21 pages).
Office Action dated Oct. 11, 2013 in U.S. Appl. No. 12/710,977, filed Feb. 23, 2010, (17 pages).
Amendment filed Jan. 17, 2014 in U.S. Appl. No. 12/710,977, filed Feb. 23, 2010, (11 pages).
Office Action dated May 8, 2014 in U.S. Appl. No. 12/710,977, filed Feb. 23, 2010, (7 pages).
Office Action dated Oct. 13, 2011 in U.S. Appl. No. 12/771,990, filed Apr. 30, 2010, (12 pages).
Amendment filed Feb. 6, 2012 in U.S. Appl. No. 12/771,990, filed Apr. 30, 2010, (10 pages).
Final Office Action dated Mar. 27, 2012 in U.S. Appl. No. 12/771,990, filed Apr. 30, 2010, (15 pages).
Amendment filed Jul. 30, 2012 in U.S. Appl. No. 12/771,990, filed Apr. 30, 2010, (10 pages).
Final Office Action dated Nov. 10, 2014 in U.S. Appl. No. 12/545,525, filed Aug. 21, 2009, (14 pages).
Amendment filed Jan. 12, 2015 in U.S. Appl. No. 12/545,525, filed Aug. 21, 2009, (29 pages).

(56) References Cited

OTHER PUBLICATIONS

Office Action dated Jun. 20, 2014 in U.S. Appl. No. 13/030,983, filed Feb. 18, 2011, (25 pages).
Amendment filed Oct. 20, 2014 in U.S. Appl. No. 13/030,983, filed Feb. 18, 2011, (21 pages).
Notice of Allowance dated Jun. 17, 2014 in U.S. Appl. No. 13/863,289, filed Apr. 14, 2013, (7 pages).
Office Action dated Oct. 22, 2014 in U.S. Appl. No. 13/097,946, filed Apr. 29, 2011, (20 pages).
Amendment filed Jun. 17, 2014 in U.S. Appl. No. 12/710,977, filed Feb. 23, 2010, (12 pages).
Office Action dated Nov. 6, 2014 in U.S. Appl. No. 12/710,977, filed Feb. 23, 2010, (34 pages).
Office Action dated Aug. 28, 2014 in U.S. Appl. No. 12/771,990, filed Apr. 30, 2010, (16 pages).
Interview Summary dated Nov. 26, 2014 in U.S. Appl. No. 12/771,990, filed Apr. 30, 2010, (3 pages).
Amendment filed Dec. 29, 2014 in U.S. Appl. No. 12/771,990, filed Apr. 30, 2010, (20 pages).

* cited by examiner

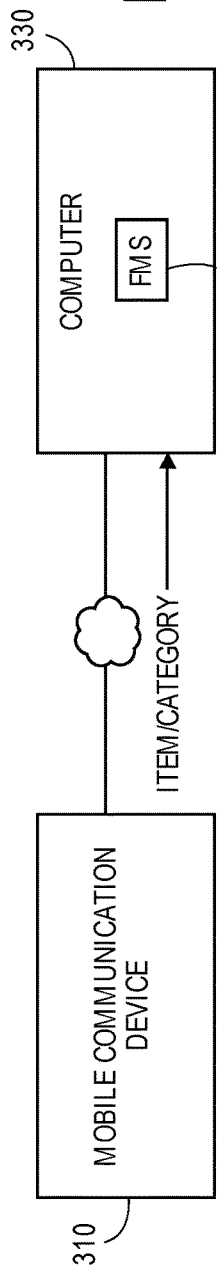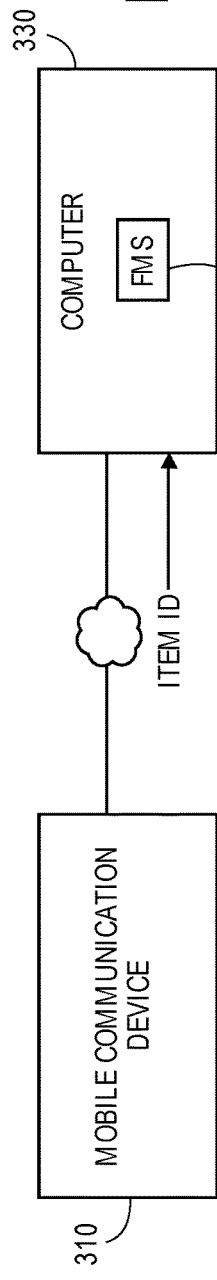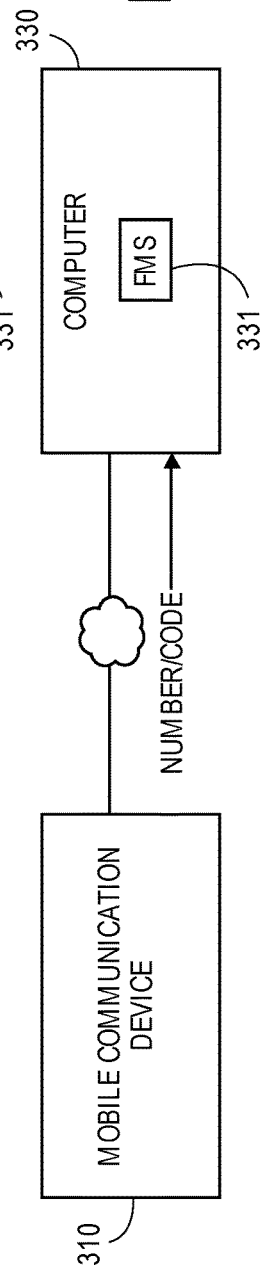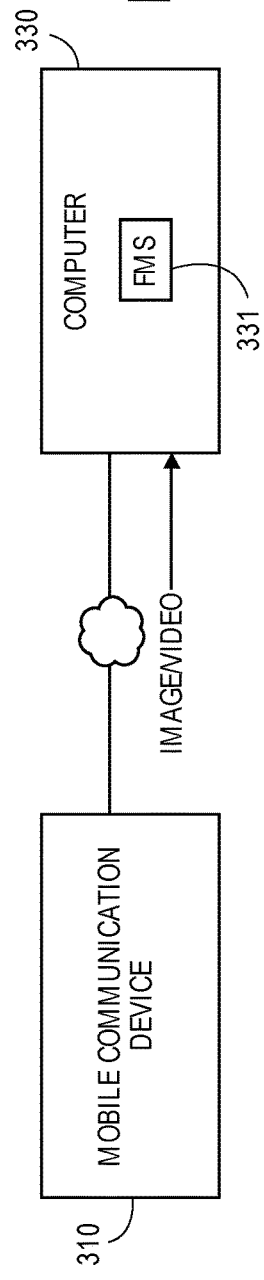

| Barcode / Number of (323) Code (324) | Item (322) | Auto / Default Category/SubCategory | User Defined Category/SubCategory | Category Utilized by Other FMS Users |
|---|---|---|---|---|
| Code 1 | Item 1 | Auto Cat 1 | User Cat 1 | Other Cat 1 |
| Code 2 | Item 2 | Auto Cat 2 | User Cat 2 | Other Cat 2 |
| Code 3 | Item 3 | Auto Cat 3 | User Cat 3 | Other Cat 3 |
| Code 4 | Item 4 | Auto Cat 4 | User Cat 4 | Other Cat 4 |
| Code 5 | Item 5 | Auto Cat 5 | User Cat 5 | Other Cat 5 |
| Code 6 | Item 6 | Auto Cat 6 | User Cat 6 | Other Cat 6 |

FIG. 9

Item 1 ⟶ Category 1
Item 2 ⟶ Category 2
Item 3 ⟶ Category 3
Item 4 ⟶ Category 4
Item 5 ⟶ Category 5

FIG. 11A

Item 1 ⟶ Category 1
Item 2 ⟶ Category 1
Item 3 ⟶ Category 1
Item 4 ⟶ Category 2
Item 5 ⟶ Category 3

FIG. 11B

| Acquisition Session | GPS Location | Merchant ID | Image/Video | Number / Code | Item ID |
|---|---|---|---|---|---|
| Session 1 | GPS 1 | Merchant 1 | Image/Video 1 | Number / Code 1 | Item 1 |
| Session 1 | GPS 1 | Merchant 1 | Image/Video 2 | Number / Code 2 | Item 1 |
| Session 1 | GPS 1 | Merchant 1 | Image/Video 3 | Number / Code 3 | Item 1 |
| Session 2 | GPS 2 | Merchant 2 | Image/Video 4 | Number / Code 4 | Item 1 |
| Session 2 | GPS 2 | Merchant 2 | Image/Video 5 | Number / Code 5 | Item 1 |
| Session 2 | GPS 2 | Merchant 2 | Image/Video 6 | Number / Code 6 | Item 1 |

FIG. 16

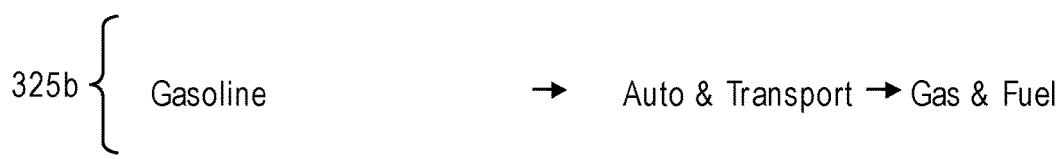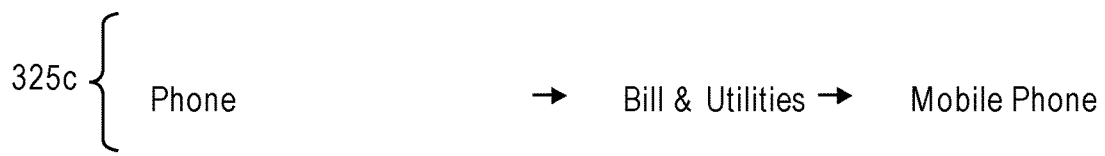
FIG. 17

… (1)

FINANCIAL MANAGEMENT SYSTEM CATEGORIZATION UTILIZING IMAGE OR VIDEO ACQUIRED WITH MOBILE COMMUNICATION DEVICE

BACKGROUND

The invention relates to personal finance, and more particularly, to item categorization for use in consumers managing their personal finances, goals and budgets.

Consumers or shoppers purchase various goods and services at various times. For example, consumers purchase goods such as groceries and other consumables, office supplies, baby supplies, etc. These items may be purchased from various merchants such as a grocery store, restaurant, or a "big box" retailer such as TARGET store or retailer, WAL-MART store or retailer and COSTCO store or retailer. TARGET is a registered trademark of Target Brands, Inc., Minneapolis, Minn., WAL-MART is a registered trademark of Wal-Mart Stores, Inc., Bentonville Ark., and COSTCO is a registered trademark of Costco Wholesale Membership, Inc., Issaquah, Wash.

Many consumers track their financial activities to manage their personal finances by collecting receipts, balancing a checkbook, or using a spreadsheet. Consumers also utilize number intensive financial management systems or finance programs and tools such as MINT financial management system, QUICKEN financial management system, QUICKBOOKS financial management system and FINANCEWORKS financial management system, which are available from Intuit Inc. MINT, QUICKEN, QUICKBOOKS and FINANCEWORKS are registered trademarks of Intuit Inc., Mountain View, Calif.

These types of financial management systems allow consumers or business owners aggregate, process and categorize financial data and present numerical data in various forms or summaries such as balances or values, charts, graphs and reports.

For example, MINT financial management system allows consumers to link their MINT financial management system account to various financial accounts at respective financial institutions so that MINT financial management system can receive transaction or account data from various financial institutions, and the consumer can view, aggregated checking, savings, loan, credit card, stock and data of other linked accounts in a centralized location using their computer or mobile communication device. In addition to providing a composite view of data of multiple accounts, data of linked accounts may also be categorized to provide a better understanding to the consumer regarding their finances.

While financial management systems have made significant improvements to assist users with managing their finances, there are some areas in which financial management systems can be improved, such as how transactions are categorized and how categorized data is processed for generating a financial summary or report. For example, it is not uncommon for consumers to purchase different types of items from a particular merchant, but a financial management system assigning a single category to the transaction based on the merchant since the financial management system may only see a line item transaction identifying the merchant and a transaction amount. Thus, individual items are not categorized since the information is missing from the line item data. Thus, while the financial management system knows the merchant involved in a transaction, categorization and subsequent generation of financial reports and summaries do not account for specific items purchased from that merchant. Consumers may manually enter the actual items purchased so that specific items are categorized, but this process can be inconvenient, tedious and time consuming.

SUMMARY

One embodiment is directed to a computer-implemented method for categorizing an item and comprises acquiring or receiving an image or video of a barcode at a computing element or processor of a mobile communication device of the consumer. The barcode identifies a specific item selected by the consumer. The method further comprises categorizing the specific item based at least in part upon the barcode with a financial management system, e.g. in the form of an application executing on the mobile communication device. Thus, in this embodiment, the mobile communication device is used to receive or acquire the image or video, process the image or video to identify the barcode, process or scan or read the barcode to identify the item, and perform local categorization of the item.

A further embodiment is directed to a computer-implemented method for item categorization and involves transmitting data of the barcode from a mobile communication device to a computer hosting a financial management system utilized by the consumer, which categorizes the item. Thus, in this embodiment, the mobile communication device is used to acquire or receive the image or video, and may process, scan or read the barcode therein, but the barcode or data determined or derived from the barcode is then transmitted to a remote computer hosting the financial management system, which performs item-level categorization.

A further embodiment is directed to a computer-implemented method for item categorization and comprises acquiring or receiving, at a computing element or processor of a mobile communication device of a consumer, a machine-readable representation of data associated with a specific item selected by the consumer. The method further comprises the computing element or processor analyzing, decoding or scanning the machine-readable representation to determine the data such as a number or code, and the computing element or processor of the mobile communication device then categorizes the specific item for the consumer based at least in part upon the data determined or derived through use of an image or video. The analysis, decoding or scanning may also be performed by the financial management system or other associated computing element.

Further embodiments involve item categorization based on data manually entered by the consumer. Thus, rather than taking a picture or video of a barcode, for example, the consumer launches an application, enters the code or numbers (e.g., numbers appearing below the barcode) into the mobile communication device such that the manually entered data is received at the computing element of the mobile communication device, and which may then identify the item and categorize the item locally or transmit the manually entered data to a computer hosting the financial management system, which may then identify the item and/or categorize the item for the consumer, and integrate the categorized item data into reports such as budget reports.

A further embodiment is directed to a computer-implemented method for categorization performed by one or both of and involving a mobile communication device of a consumer and a computer hosting a financial management system that is used by the consumer to assist the consumer in managing his or her finances. The method comprises receiving, at a computing element of a mobile communication device utilized by the consumer, a digital image or video of a machine-readable representation of data (such as a barcode) associated with a specific item offered by a merchant and selected by the consumer for purchase from the merchant. The digital image or video being acquired with the mobile communication device, e.g., with an integrated camera of the mobile communication device. The method further comprises transmitting barcode data (such as the image or video itself, data or code generated from decoding or scanning the barcode, or the identification of the item identified by the barcode) from the mobile communication device to a computer hosting a financial management system utilized by the consumer to manage the consumer's finances and that categorizes the specific item for the consumer. Embodiments may involve computer-implemented methods performed by a mobile communication device, e.g., a processor or computing element thereof, computer-implemented methods performed by the financial management system or computer hosting the financial management system.

Further embodiments are systems for categorizing an item selected for purchase by a consumer. A system may comprise a mobile communication device or component (e.g., application) thereof, a computer hosting a financial management system, both a mobile communication device and a computer hosting a financial management system. For example, one embodiment of a system comprises a mobile communication device of a consumer, or an application executable on the mobile communication device, and a computer, or financial management system hosted by a computer, which is in communication with the mobile communication device through a network. The consumer has an account with the financial management system and utilizes the financial management system to manage the consumer's finances. The application, which may be a native or downloaded application, is executable by a processor or computing element of the mobile communication device, which is configured to acquire a digital image or video of a machine-readable representation of data associated with a specific item offered by a merchant and selected by the consumer for purchase from the merchant and transmit machine-readable representation data from the mobile communication device to the financial management system. The financial management system is configured to categorize the specific item selected by the consumer based at least in part upon the data received from the mobile communication device.

Further embodiments are directed to computer program products, applications or articles of manufacture for implementing categorization methods or processes. For example, one embodiment is directed to a native or downloadable application or a non-transitory computer readable medium embodying a computer program which, when executed by a processor, causes a computer to implement an item level categorization processes.

In a single or multiple embodiments, the processor or other computing element of the mobile communication device analyzes, decodes, reads or scans a machine readable representation of data associated with an item (e.g., a barcode) within the digital image or video to determine a corresponding number or code (which may, in certain barcodes, be a number printed below the barcode). In other embodiments, the barcode is analyzed, decoded, read or scanned by the financial management system or a system or program associated with the financial management system. The specific item with which the barcode is associated is determined after analysis, decoding, reading or scanning (e.g., via a look up in a table cross-referencing barcode data and items), and categorization of the individual item is performed at the mobile communication device using this data, or the item identification may be transmitted to the financial management system computer, which performs item-level categorization.

In a single or multiple embodiments, the mobile communication device is utilized by the consumer to acquire an image or video using a camera or other optical element of the mobile communication device. The image or video is received by the computing element of the mobile communication device, e.g., before the specific item is purchased and before the consumer leaves the merchant store. For example, the consumer may select an item, take an image or video of the item's barcode, and add the item to the shopping cart. This may also be done while the consumer is waiting in line, or after the consumer has paid for the items, while still being performed before the consumer leaves the merchant's building or store, and may be done automatically upon acquiring an image or video and detecting the barcode, or in response to a consumer request.

According to certain embodiments, the state or functionality of a mobile communication device may depend on the location of the mobile communication device. For example, how and/or when the mobile communication device acquires an image or video and transmits data to the financial management system computer may depend on the global positioning system (GPS) location of the mobile communication device. For example, the location of the mobile communication device is tracked by an application executing on the mobile communication device to determine when the consumer is located in the merchant store, in response to which an acquisition session is initiated for items selected by the consumer while in that particular merchant store. Images or videos of item barcodes can be acquired during this "active" or "acquisition" state or session when it is determined that the consumer is located inside of the merchant store, and acquired data can be tagged as being related to items offered by that particular merchant. Data to be used for categorization can be transmitted in response to a consumer request or automatically, e.g., upon initiation of a transmission state or session, which may begin upon or after termination of the acquisition session, which ends when the consumer's current location and merchant location no longer match.

Embodiments may involve the selection or purchase of a single item or multiple items by a consumer. In the case of multiple items, images or videos of respective barcodes of the specific items are acquired, barcode data in the form of respective numbers or codes are determined or derived, and the specific items are identified. According to embodiments, multiple items can be independently categorized based on the image or video such that with embodiments, for example, 10 different categories may be assigned to respective 10 different items purchased from a single merchant. This is in contrast to various known systems that group items together and categorize the group, e.g., systems that perform categorization based on transaction line items, which identify merchant and amount. In other embodiments, a first category can be assigned to a first item, and a second category is assigned to a plurality of other terms such that budgets and other financial summaries or reports can be generated according to those respective categories.

In a single or multiple embodiments, when the mobile communication device is in an acquisition or active state or when data is transmitted from the mobile communication device to the financial management system computer is based at least in part upon the current location of the consumer. In one embodiment, a computing element of the mobile communication device tracks the current location of the consumer based on a global positioning system (GPS) location of the mobile communication device. The mobile communication device is placed in an active or acquisition state, or an acquisition session is initiated, when it is determined that the consumer or the consumer's mobile communication device is within a merchant store or at a merchant location. During the acquisition state, the consumer can acquire images or video of item barcodes, which may be transmitted automatically and immediately, or stored for transfer in response to a user request or for future automatic transfer after the consumer leaves the merchant store or location, as determined from a change of the GPS data.

In a single or multiple embodiments, categorization is performed locally at the mobile communication device, and categorization results are transmitted to the financial management system computer. In other embodiments, categorization is performed at the financial management computer using data received from the mobile communication device. A category for a particular item may be automatically determined by the financial management system, selected or specified by the consumer, or based on how other users of the financial management system have categorized the same or similar item, e.g., based on pre-determined criteria of a certain number of users changing a category that was initially determined by the financial management system.

In a single or multiple embodiments, the results of categorization are provided to the mobile communication device and displayed to the consumer, e.g., in the form of a budget report or other financial summary that is based on pre- or post-categorization. In this manner, after acquiring an image or video of the item's barcode, the consumer can be presented with a budget or other financial report related to that item or category thereof, e.g., even before the item is purchased by the consumer, to inform the consumer of the current budget or the budget resulting from purchase of the selected item including the imaged barcode.

In a single or multiple embodiments, the machine-readable representation of data of an item is a barcode such as a one-dimensional barcode, a two-dimensional barcode or a three-dimensional barcode, which may or may not have corresponding numbers or codes beneath the barcode. The machine-readable representation may, for example, be a data matrix or a Quick Response (QR) code, and a number or code may or may not appear within or below the machine-readable representation of data.

BRIEF DESCRIPTION OF THE DRAWINGS

The foregoing and other aspects of embodiments are described in further detail with reference to the accompanying drawings, wherein:

FIGS. 8A-D illustrate how embodiments may involve transmission of different types of information from a mobile communication device to a financial management system computer and how different processing may be performed by the mobile communication device and financial management system computer;

FIG. 9 is a table constructed according to one embodiment for storing data about machine readable representations of respective items and how such items are categorized;

FIGS. 11A-B illustrate how embodiments may be utilized to assign the same or different categories to different individual items;

FIG. 16 is a table constructed according to one embodiment for storing data about images or videos including machine readable representations of respective items acquired during acquisition sessions for different merchants;

FIG. 17 illustrates examples of how item of different merchants can be categorized according to embodiments.

DETAILED DESCRIPTION OF ILLUSTRATED EMBODIMENTS

Embodiments relate to categorizing items selected by a user or a consumer for purchase from a merchant utilizing an image or video including a machine readable representation of data (such as a barcode) associated with the selected item. With embodiments, financial management systems can categorize individual, specific items purchased from the same merchant or from different merchants even when transaction data (such as a line item charge of a bank or credit card account) only identifies the merchant and transaction amount. Thus, with embodiments, specific items can be individually categorized rather than assigning one category to a purchase made from a merchant. In this manner, embodiments provide for more accurate categorization and generation of more accurate and meaningful financial reports for consumers.

Figure 1:
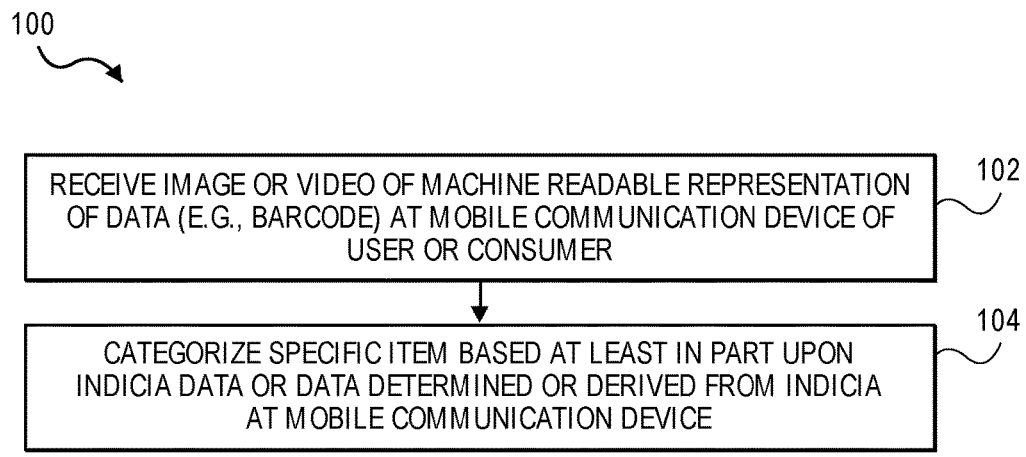
FIG. 1 is a flow diagram of one embodiment of a method for local categorization of specific items at a mobile communication device based on an image or video of an item barcode or other machine readable representation of data associated with the item.

For example, referring to FIG. 1, a categorization method 100 according to one embodiment comprises, at 102, a digital image or video of a machine readable representation of data (such as barcode) of an item selected by a user or consumer for purchase from a merchant is received at a processor or computing element of a mobile communication device. At 104, the mobile communication device is operable for local categorization of the item, the identity of which is determined or derived from the barcode within the image or video. For this purpose, for example, a financial management system (FMS) program or application (such as a MINT mobile application) may execute on the mobile communication device.

Figure 2:
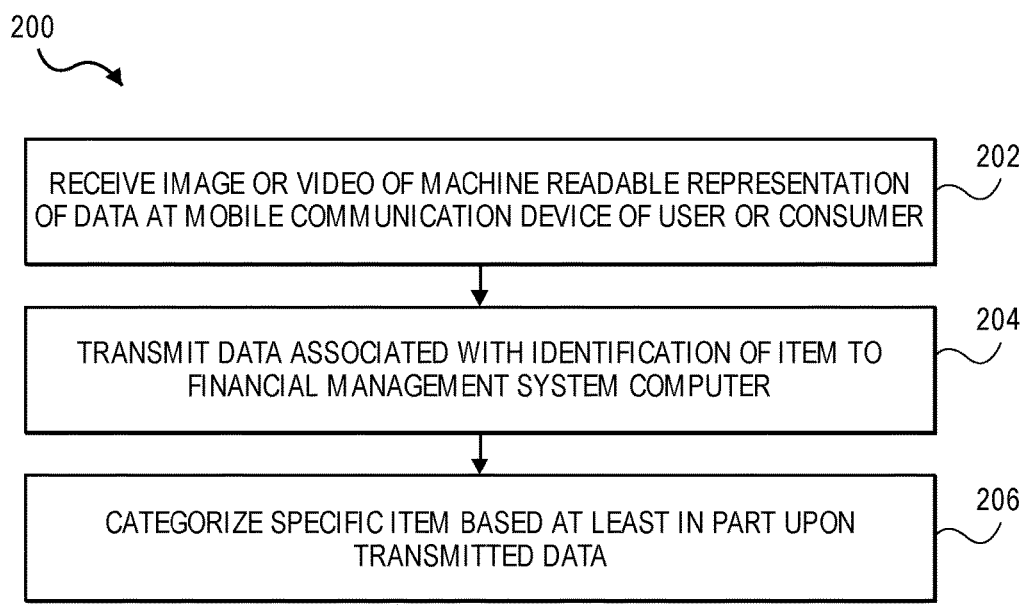
FIG. 2 is a flow diagram of one embodiment of a method for remote categorization of specific items at a computer hosting a financial management system and that is in communication with a mobile communication device based on an image or video of an item barcode or other machine readable representation of data associated with the item.

Referring to FIG. 2, a categorization method 200 according to another embodiment comprises, at 202, a digital image or video of a machine readable representation of data (such as barcode) of an item selected by a user or consumer for purchase from a merchant is received at a processor or computing element of a mobile communication device as described with reference to FIG. 1, but at 202, data related to the barcode is transmitted to the FMS at a remote location relative to the mobile communication device through a network. At 206, the FMS categorizes the item based at least in part upon the data received from the mobile communication device. Thus, categorization is performed remotely relative to the mobile communication device, by the FMS.

In this manner, embodiments provide for categorization of items that may otherwise not be categorized due to, for example, being part of a group of items purchased from a merchant, and categorization is performed on a merchant basis rather than on an item basis. Further, embodiments reduce or eliminate the need for users or consumers to manually enter item and categorization data in order to allow the FMS to categorize individual items. Embodiments provide these capabilities while providing "on the spot" or real time categorization, and categorization using communications between a mobile communication device and a computer hosting the FMS. As a result, categorization on an item-level is achieved with embodiments is more convenient and comprehensive than current categorization systems, methods and programs, thus resulting in more comprehensive and accurate financial summaries and reports related to budgets, spending and personal finance goals. Further aspects of embodiments are described with further reference to FIGS. 3-18.

Figure 3:
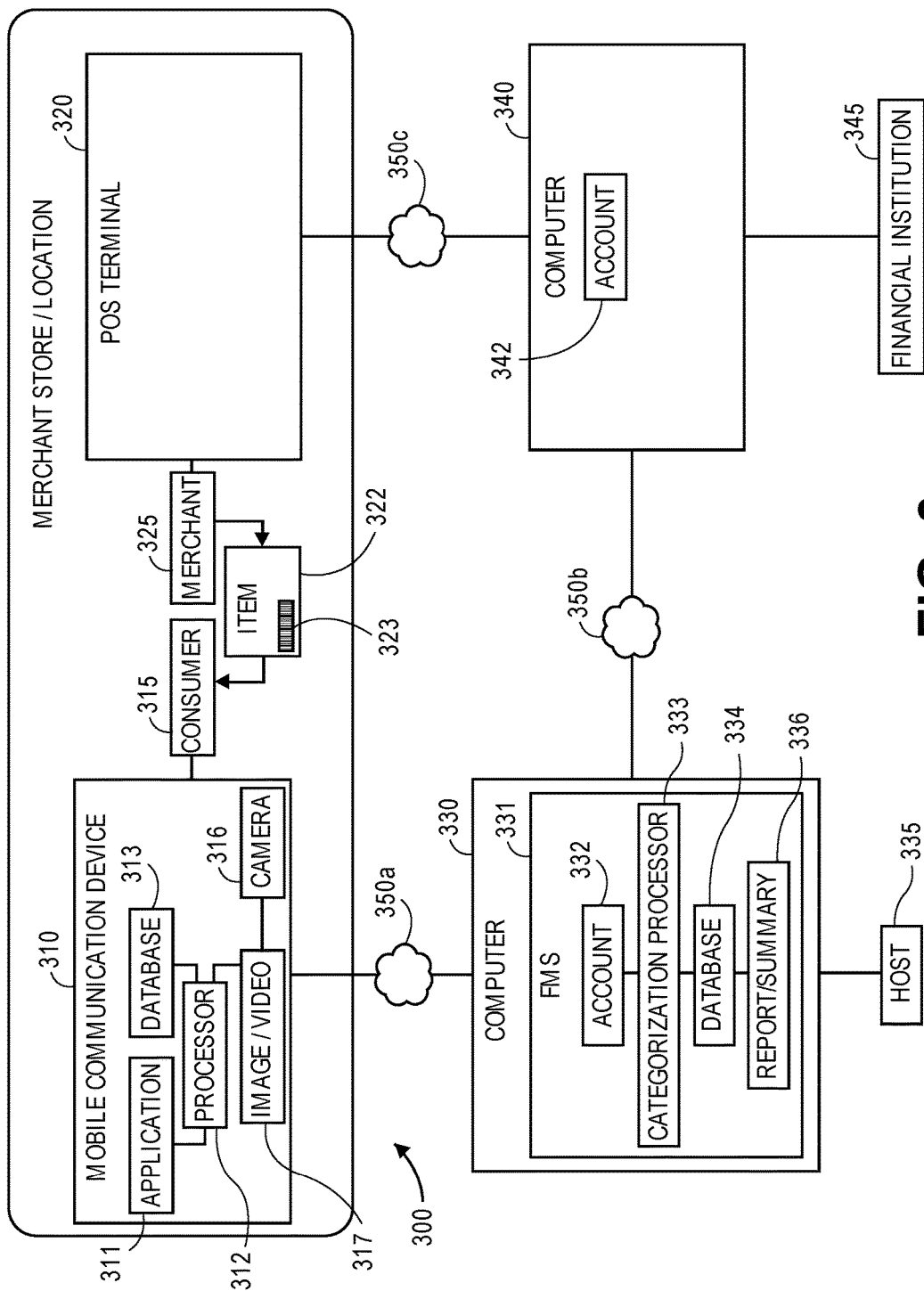
FIG. 3 is a diagram of one embodiment of a system for categorizing items selected by a user or consumer based at least in part upon an image or video of the a barcode or other machine readable representation of data acquired with a mobile communication device.

Referring to FIG. 3, a system 300 constructed according to one embodiment or including components utilized to execute or implement computer-implemented method embodiments for categorizing items comprises or involves a user or consumer 315 (generally, consumer) carrying or utilizing a mobile communication device 310, one or more merchants 325 (one merchant is illustrated) that offers various items 322 for sale and utilizes a merchant computer 320 to process sales of items 322 to the consumer 315, a host 335 of an intermediate computer 330 including or accessing a financial management system (FMS) 331. For ease of explanation, reference is made to a FMS 331, and a host computer or FMS computer 330. Completed transactions are processed by a bank or financial institution (FI) 345, and a computer 340 of the FI 345 may be in communication with both the merchant computer 320 and the host computer 330 in embodiments in which the FMS 331 receives electronic transaction data from a FI 345, e.g., from a consumer's checking or credit card account 342 at the FI 345.

While FIG. 3 illustrates one consumer 315, one merchant 325, one host 335, and one FI 345, it will be understood that embodiments may involve multiple consumers 315, multiple merchants 325, multiple hosts 335 and/or multiple FIs 345, and in various combinations. Accordingly, FIG. 3 is generally provided to identify parties or system 300 components that may be involved in embodiments.

The mobile communication device 315 carried by the consumer 315 may be a cellular telephone, a smartphone or other mobile device capable of cellular or wireless communications or a portable computing device such as tablet, laptop or other portable computing device capable of communicating with the host computer 330. For ease of explanation, reference is made generally to a mobile communication device or smartphone 310 of the consumer 315. A program or application 311 executes on the mobile communication device 310 and executes embodiments through or utilizing a computing element or processor 312 (generally, processor) and associated memory, database or data store 313 (generally, database) of the mobile communication device 310. The mobile communication device 310 also includes an optical element 316 such as a camera or lens, operable to acquire an image or video 317 of an object.

The merchant computer 320 may, for example, an electronic payment device such as a Point of Sale (POS) payment terminal, a cash register, a computer and a scanner system utilized by merchant 325. The FI 345 may be a bank, credit union, credit card company or other FI 345 involved in processing transactions involving the consumer 315 and merchant 325.

As shown in FIG. 3, the mobile communication device 310, merchant computer 320, and FI computer 340 are operably coupled to or in communication with the host computer 330 managed by host 335, an example of which is Intuit Inc. System 300 components may be in communication with each other through respective networks 350a-c (generally, network 350). Examples of networks 350 that may be utilized for communications between system 300 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 350 generally, but various networks, combinations of networks and communication systems, methods and protocols may be utilized in embodiments.

According to embodiments, the intermediate computer 330 hosts a FMS 331 with which the consumer 315 has an account 332 for managing the consumer's personal finances. The FMS 331 is used solely for financial management and assists consumers 315 with managing their finances without limiting the use of tax strategies by a taxpayer or tax advisor. Examples of a FMS 331 that may include a processor 333 for performing item-level categorization and configured for use in embodiments include, but are not limited to, MINT financial management system, QUICKEN financial management system, QUICKEN On-Line financial management system, FINANCEWORKS financial management system, and MICROSOFT Money.

The categorization processor 333 and a database 334 are cooperatively operable to aggregate, store and process electronic transaction data received from various electronic sources including FI computers 340 and/or merchant POS terminals 320. It will be understood that processor 333 and database 334 components are also embodied in or utilized by the FMS application 311 executing on the mobile communication device 310 such that functionality and capabilities of the FMS 331 are also applicable to the FMS application 311.

According to embodiments, categorization processor 333 receives data from the consumer's mobile communication device 310 and, if not already identified, identifies items 322 selected by the consumer 315, and which may be purchased by the consumer 315. The categorization processor 333 is configured to, or comprises instructions which, when executed, determine a category for the received item 322 data and generate financial summaries or reports 336 (generally, financial summary) such as a summary or report relating to a budget, finance goal, spending activity, net worth, etc.

While FIG. 3 shows the categorization processor 333 as being embodied in the FMS 331, embodiments are not so limited, and the FMS 331 and categorization processor 333 may be separate programs, hosted by the same intermediate computer 330 or by different computers that communicate with each other via a network 350. Further, it will be understood that the application 331 native or downloaded to the mobile communication device 310 to implement embodiments may be a mobile application version of the FMS 331.

A FMS 331 as described above is thus defined to include, any computing system implemented, on-line or web-based, system, package, program, module, or application that gathers electronic transaction data, has the capability to receive or retrieve electronic transaction data, analyze and categorize at least part of the electronic transaction data into various reports or displays that are provided to consumer 315 and provides consumer 315 with the capability to conduct, and/or monitor, financial transactions. For example, a FMS 331 such as MINT financial management system may categorize consumer transactions based on categories such as mortgage, daycare, utilities, groceries, restaurants, gas & fuel, clothing, movies & DVDs, coffee shops, fast food, personal care, entertainment, health care, shopping, home, auto & transport, and kids, and MINT financial management system may display data of multiple accounts (e.g., checking, credit card, etc.) to the consumer 135.

Figure 4:
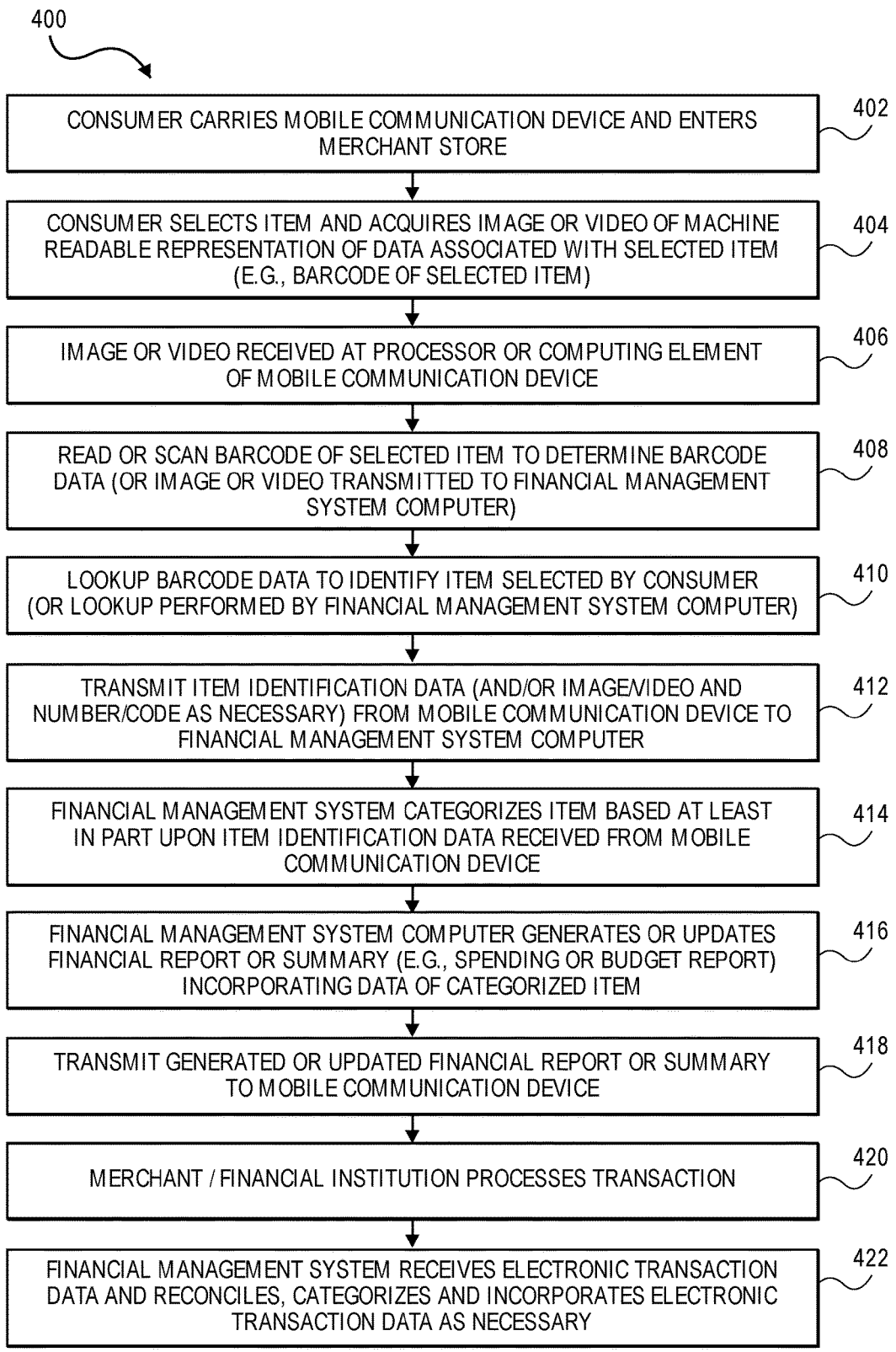
FIG. 4 is a flow diagram of one embodiment of a method for categorization of specific items based on an image or video of an item barcode or other machine readable representation of data associated with the item and displaying a financial report or summary to the user or consumer.

Referring to FIG. 4, and with continuing reference to FIG. 3, one embodiment of a computer-implemented method 400 for categorizing items selected or purchased by a consumer 315 utilizing an image or video 317 of the item 322 comprises, at 402, the consumer 315 entering a merchant store or location (generally, merchant store, and represented by dashed line around mobile communication device 310 and merchant's POS terminal 320) while carrying the mobile communication device 310 into the merchant store. At 404, the consumer 315 selects an item 322 and acquires an image, series of images or video 317 (generally, image or video) of a machine readable representation or indicia 323 of data associated with selected item 322. For example, the machine readable representation of data 323 may be a barcode associated with or affixed to, or part of the packaging of, the selected item 322. The barcode 323 may be a 1-dimensional, 2-dimensional, or 3-dimensional bar code, examples of which include, but are not limited to, Universal Product Code (UPC) codes, or other codes such as a QR code or data matrix. For ease of explanation, reference is made generally to a barcode 323, but it will be understood that a barcode 323 does not necessarily have "bars" while still identifying an item and thus may be utilized in embodiments.

Figure 5:
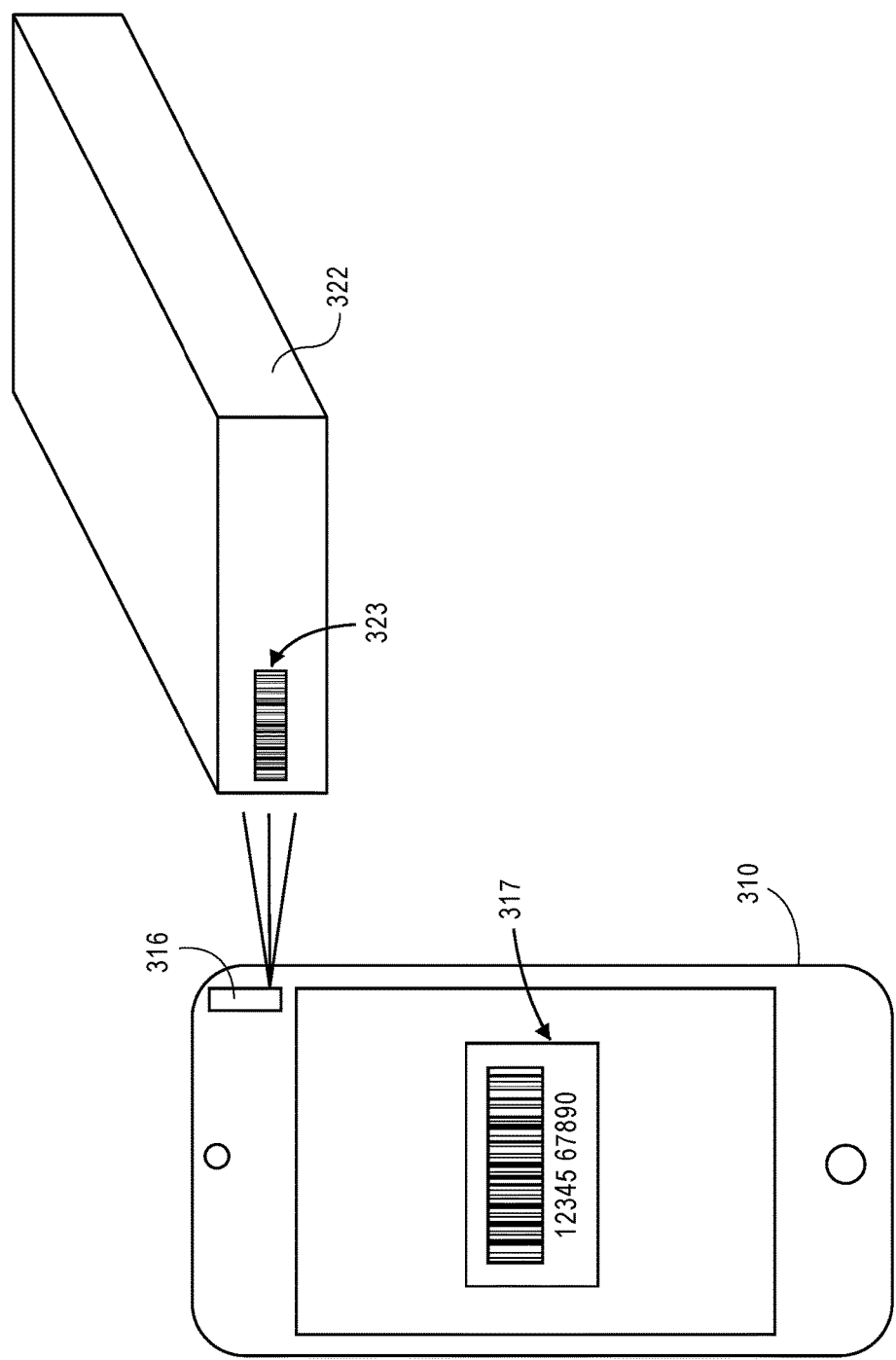
FIG. 5 illustrates an item or product and a barcode attached thereto, and a mobile communication device acquiring an image or video of the barcode or other machine-readable representation of data

At 406, and with further reference to FIG. 5, the consumer 315 points an optical element or camera 316 of the mobile communication device 310 toward the barcode 323 affixed to the item 322 of interest that was selected by the consumer 315, and acquires an image or video 317 of or including the barcode 323 using the camera/video functionality of the mobile communication device 310. The resulting image or video 317 of or including the barcode 323 may be stored in the database 313 or memory of the mobile communication device 310 as necessary. At 408, the image or video 317 is retrieved by, provided to or received at a computing element or processor 312, which identifies the barcode 323 within the acquired image or video 317 and reads or scans the barcode 323 to determine corresponding barcode data or other numerical or alpha-numerical code 324. Identification and reading of a barcode within an image or video may be performed using known image analysis systems, including, as one example, those available from Shopsavvy, Inc., Dallas, Tex.

While various embodiments are described with reference to launching the FMS application 311 first, and then acquiring an image or video 317 of the item barcode 323, it will be understood that the consumer 315 may acquire an image or video 317 of the item barcode 323, store the image or video 317 to memory or a database 313, and then launch the FMS application 311 to retrieve the image or video 317 from the memory or database 313 for processing according to embodiments. Thus, the computing element may receive the image or video that is acquired before or after the FMS application is launched by the consumer.

Figure 6:
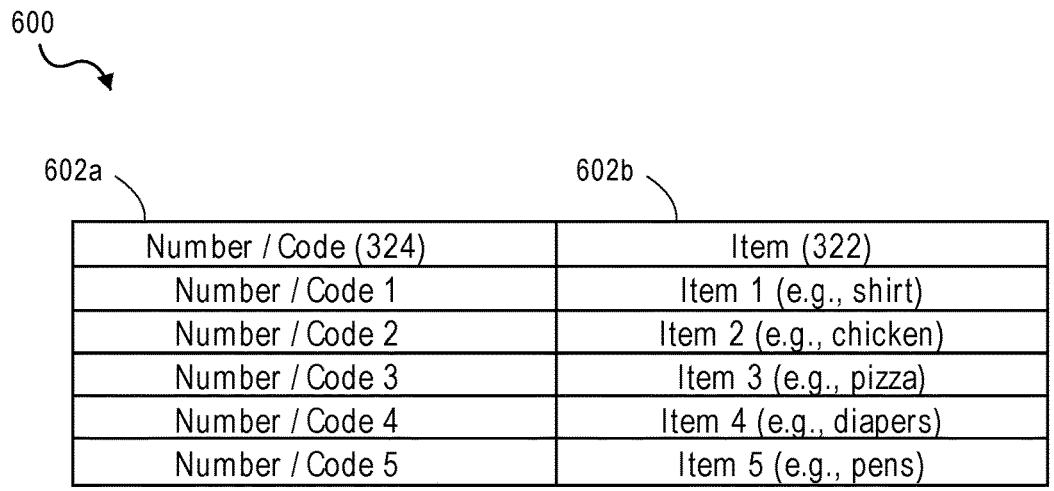
FIG. 6 illustrates a table cross-referencing a number or code determined or derived from reading or scanning a barcode and specific items to which the barcode or other machine readable representation of data applies.

At 410, and with further reference to FIG. 6, the computing element 312 of the mobile communication device 310 looks up the barcode number, code or other data 324 determined or derived from scanning or reading the barcode 323, to identify the item 322 selected by consumer 315 and the image or video 317 of the barcode 323 of which was acquired. For this purpose, a memory or database 313 residing locally on the mobile communication device 310 may host a table 600 cross-referencing barcode numbers 324 and corresponding items 322, or the mobile communication device 310 may connect to an external source, server or website (not shown in FIG. 3), which hosts a database of including this data.

Figure 7:
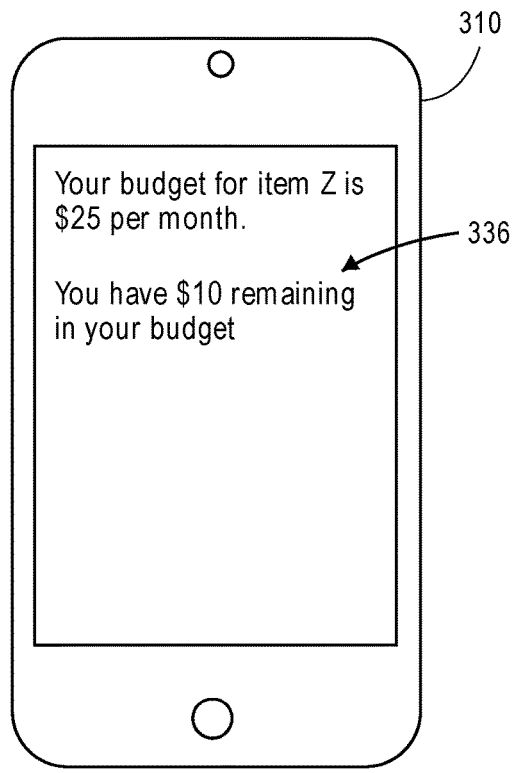
FIG. 7 illustrates one manner in which a financial report or summary can be displayed to the user or consumer after an image or video of a barcode or other machine readable representation of data is acquired.

With further reference to FIG. 4, at 412, having identified the item 322 selected by the consumer 315, the item identification is transmitted from the mobile communication device 310 to the FMS computer 330, and at 414, the FMS 331 receives the item identification data, categorizes the item 322, and at 416, generates or updates financial report or summary 326 (e.g., spending or budget report) incorporating data of categorized item 322. In certain embodiments, if desired, at 418, the generated or updated financial report or summary 326 is transmitted from the host computer 330 to the mobile communication device 310 so that, as generally illustrated in FIG. 7, the consumer 315 can view financial reports and summaries 326 related to the scanned item 322.

Referring again to FIG. 4, at 420, if the consumer 315 decides to purchase the selected item 322, the consumer 315 tenders payment to the merchant 315 to purchase the item 322 (e.g., by tendering a credit card), and the merchant 325 and FI 345 process the transaction, and at 422, the resulting electronic transaction data may be retrieved from the FI computer 340 and incorporated into a report or summary 336 as necessary or used to supplement, update, confirm the categorization performed based on data received from the consumer's mobile communication device 310.

In the embodiment described above with reference to FIG. 4, and with further reference to FIG. 8A, the FMS application 311 and/or computing element 312 of the mobile communication device 310 process the image or video 317 containing the barcode 324 to eventually identify the selected item 322 locally and also categorize the item 322 locally at the mobile communication device 310. The category may then be displayed to the consumer 315 or the FMS application 311 may update or generate financial reports 336 incorporating the data about the categorized item 322. The item 322 data and resulting item categorization and/or generated or updated reports 336 may then be synched to the FMS computer 330. Thus, in the embodiment shown in FIG. 8, all of the processing from image or video 317 acquisition to categorization of the item 322 is performed on the mobile communication device 310 under control of the FMS application 311 and computing element 312.

Referring to FIG. 8B, according to another embodiment, the FMS application 311 and/or computing element 312 of the mobile communication device 310 process the image or video 317 containing the barcode 323 to eventually identify the selected item 322 locally, and the identification of the item 322 is transmitted from the mobile communication device 310 to the FMS computer 330. The FMS 331 then categorizes the item 322 remotely relative to the mobile communication device 310. The FMS 331 may then update or generate financial reports 336 incorporating the data about the categorized item 322 and transmit such reports 336 back to the consumer 315 for viewing on the mobile communication device 310.

Referring to FIG. 8C, according to another embodiment, the FMS application 311 and/or computing element 312 of the mobile communication device 310 process the image or video 317 containing the barcode 323 to locally determine the number or code 324 resulting from reading or scanning the barcode 323, and this number or code 324 is transmitted from the mobile communication device 310 to the FMS computer 330. The FMS 331 then looks up the number or code 324 in the cross-reference table 600 to identify the item 322, and categorizes the item 322 remotely relative to the mobile communication device 310. The FMS 331 may then update or generate financial reports 336 incorporating the data about the categorized item and transmit such reports back to the consumer 315 for viewing on the mobile communication device 310.

Referring to FIG. 8D, according to another embodiment, the FMS application 311 and/or computing element 312 of the mobile communication device 310 acquire the image or video 317 including the barcode 323, and the image or video 317 itself is transmitted from the mobile communication device 310 to the FMS computer 330. The FMS 331 or processor 333 analyzes the image or video 317 to identify the barcode 323, read or scan the barcode 323 to determine the corresponding number or code 324, looks up the number or code 324 in the table 600, identifies the selected item 322, and categorizes the item 322. Thus, in this embodiment, the image or video 317 is acquired using the mobile communication device 310, but subsequent processing of the image or video 317 and categorization are performed by the FMS 331 remotely relative to the mobile communication device 310.

Further, referring to FIG. 9, the FMS 331 can categorize an item 322 based on data received from the mobile communication device 310 in different manners. In the illustrated embodiment, the FMS 331 (or the FMS application 311 on the mobile communication device 310) may maintain a table or other data structure 900 specifying how a particular item 322 is categorized. The table 900 may include columns 901a-e for data such as the number or code 324 determined or derived from the image or video 317 of the barcode 324, the identification of the item 322, and category 902a-c options (generally, 902) and subcategory 904a-c options (generally, 904) for the item 322 such as how the FMS 331 will automatically categorize the item or assign a default category, a user-defined or user-specified categorization, and categorization based on how other users of the FMS 311 have categorized the same or similar items, or if such other users changed the category of an item that was automatically assigned to the item 322 by the FMS 331 in other instances of categorization of that item 322 or a similar item.

For example, in the absence of user definitions or preferences, the FMS 331 may automatically categorize an item 322 as specified in column 901c. The FMS 331 may be configured such that a user-defined or specified category for a particular item overrides or takes priority over a default or automatically determined category. Further, the FMS 331 can monitor how other users of the FMS 331 accept the automatically determined categories and adapt or dynamically adjust how it automatically assigns categories to items 322 based on changes implemented by other users. For example, the FMS 331 may specify that if at least 50% of FMS users change an automatically determined or default category of an item 322 to another category, the FMS may dynamically adjust the automatic categorization to the category adopted by other users. Accordingly, it will be understood that an item 322 may be categorized in various ways, and FIG. 9 showing how an item 322 can be categorized automatically, based on a user specification, or by monitoring how other users of the FMS 331 categorize the same or different items 322 are provided as examples of how embodiments may be implemented to categorize items identified from an image or video 317 acquired with the consumer's mobile communication device 310.

FIGS. 10-13 further illustrate how embodiments may be implemented to categorize different items 322 based on respective images or videos 317 acquired by a consumer 315 using a mobile communication device 310. Various details regarding the embodiments shown in FIG. 10 and described with reference to FIGS. 1-9 are not repeated.

Figure 10:
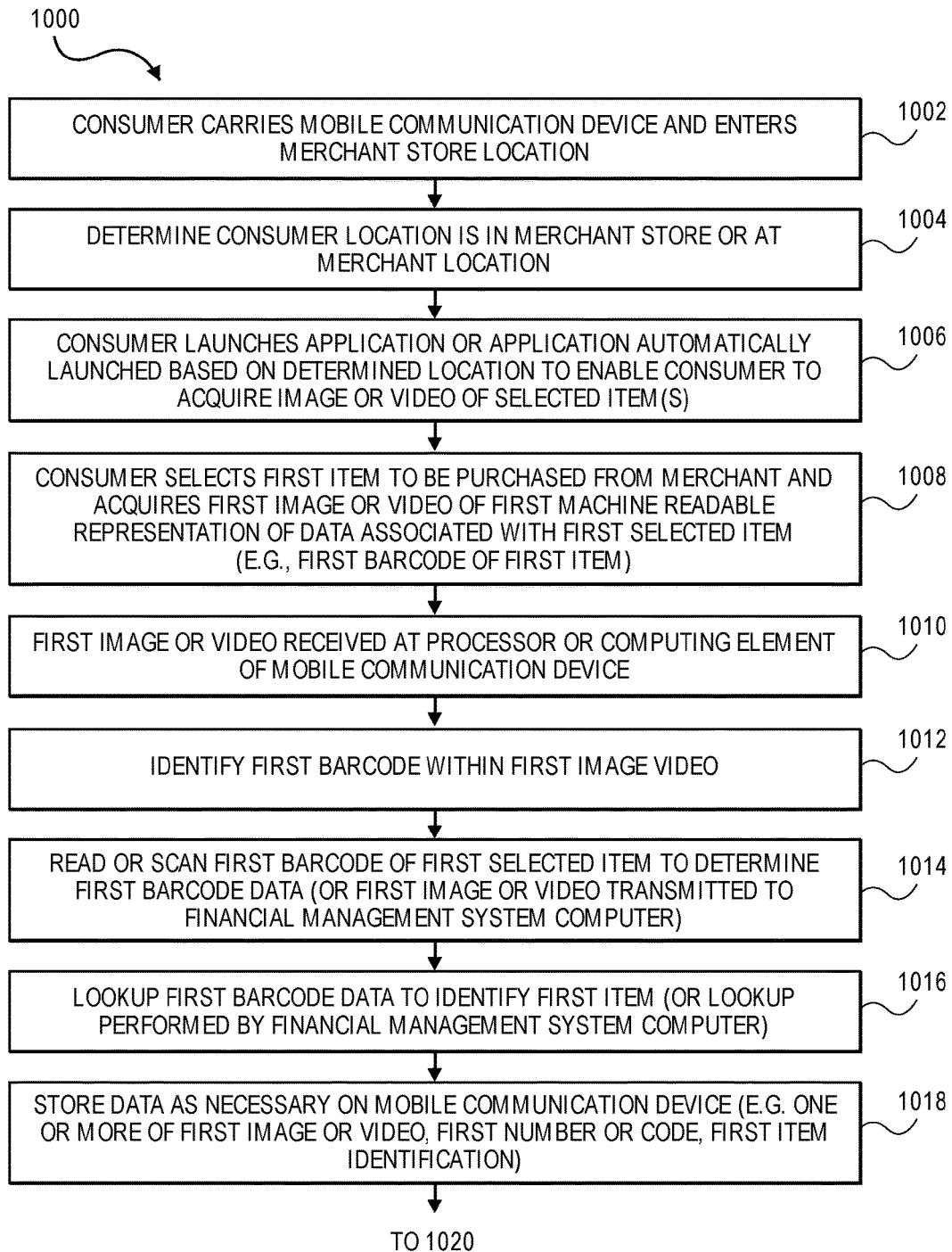
FIG. 10 is a flow diagram of one embodiment of a method for categorization of multiple specific items based on an image or video of an item barcode or other machine readable representation of data associated with the items.
Figure 10:
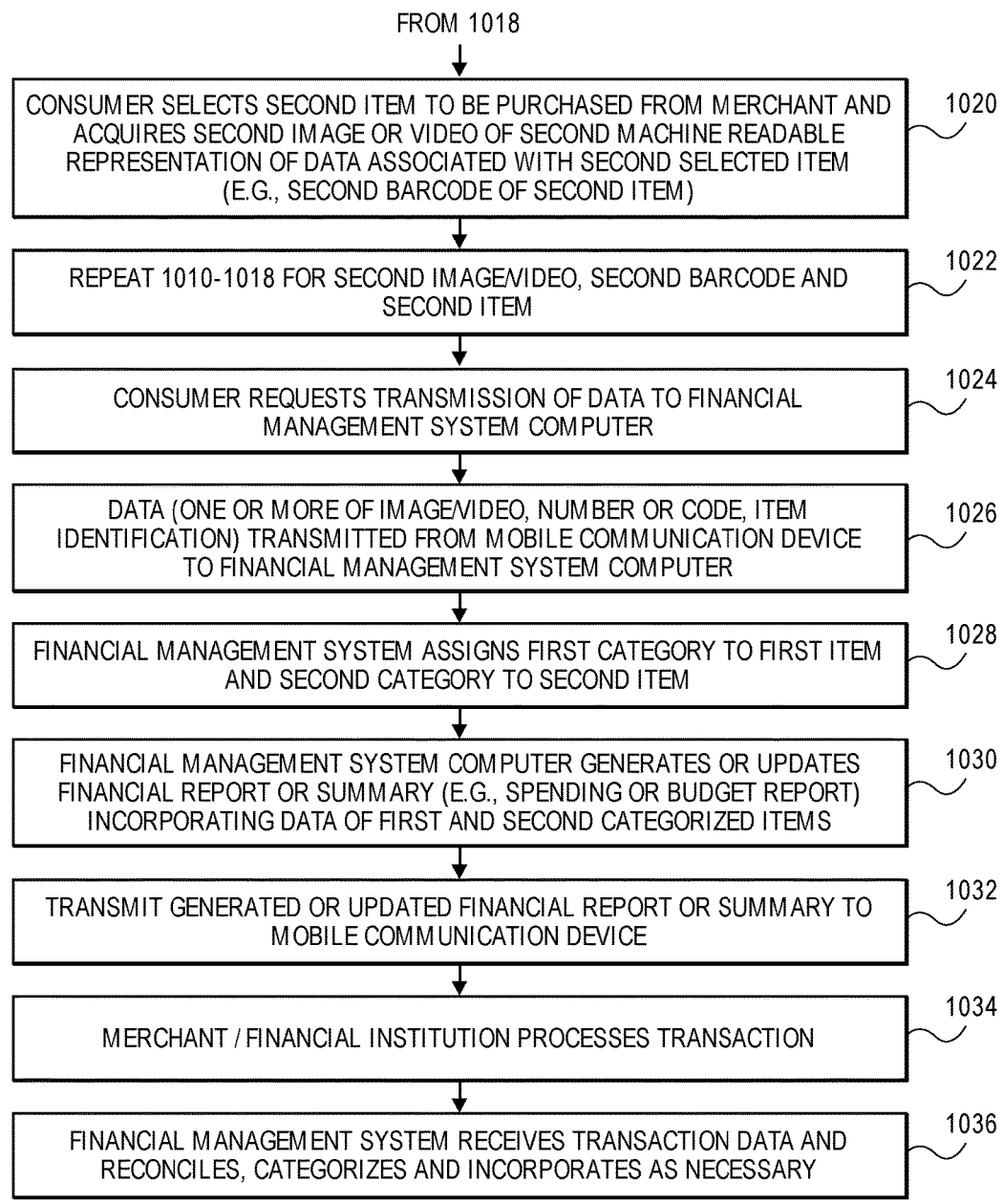

Referring to FIG. 10, and with continuing reference to FIG. 3, a further categorization method 1000 comprises, at 1002, the consumer 315 entering the merchant 325 store or location with the mobile communication device 310, and if necessary, at 1004, the computing element 312 determining that the consumer 315 is located within the merchant 325 store or location, e.g., based on Global Positioning System (GPS) data of the mobile communication device 310. At 1006, the consumer 315 manually launches the FMS application 311, or the FMS application 311 is launched based on the determination at 1004 that the consumer 315 is located within the merchant 325 store such that the consumer 315 can acquire image or video 317 of selected item(s) 322.

Continuing with 1008, the consumer 315 selects the first item 322a as a possible purchase from or to be purchased from merchant 325 and acquires first image or video 317a of first machine readable representation of data 323a associated with first selected item 322a (e.g., first barcode of first item), and at 1010, the first image or video 317a is received at the processor or computing element 312 of mobile communication device 310. While various embodiments are described with reference to launching the FMS application first, and then acquiring an image or video 317a of the item barcode 323a, it will be understood that the consumer 315 may acquire an image or video 317a of the item barcode 323a, store the image or video 317a to a database 313 or memory of the mobile communication device 310, and then launch the FMS application 311 to retrieve the image or video 317a from the database 313 or memory for categorization processing.

Continuing with FIG. 10, at 1012, the FMS application 311 or the computing element 312 of the mobile communication device identifies the first barcode 323a within first image or video 317a, and at 1014, the computing element 312 or another suitable scanning component reads or scans the first barcode 323a to determine first barcode data 324a such as a number, sequence of numbers or other code. At 1016, the computing element 312 accesses a table or database 600 to lookup the first barcode data 324a and identify the first item 322a, and at 1018, if necessary, the computing element 312 may store data to a database or memory of the mobile communication device 310 such as data including the first image or video 317a, first number or code 324a and/or first item 322a identification).

At 1020, the consumer 315 selects another item 322b as a possible purchase or to be purchased from merchant 325 and acquires another image or video 317b of another barcode 323b machine readable representation of data 323b associated with the other selected item 322b (e.g., second barcode of second item), and at 1022, various steps described above (e.g., 1010-1018), are performed for the second image/video 317b, second barcode 323b and second item 322b, and any additional other images/video 317n, barcodes 323n and items 322n.

At 1024, consumer 315 requests transmission of data to the FMS computer 130 or transmission is initiated by the FMS application 311 each time processing is completed with respect to each image or video 317. At 1026, data (such as one or more of image/video 317, number or code 324, item 322 identification) is transmitted from the mobile communication device 310 to the FMS computer 330.

With further reference to FIGS. 11A-B, at 1028, the FMS 331 determines or assigns a first category to the first item 322a and a second category to the second item 322b. For example, as shown in FIG. 11A, each item purchased from the same merchant 325 may be assigned its own category 902, whereas in FIG. 11B, there may be multiple items 322 assigned to the same category 902. Thus, with embodiments, a transaction from a single merchant involving different types of items 322 (e.g., purchases from merchants such as TARGET store or retailer, WAL-MART store or retailer, COSTCO store or retailer, etc.) is categorized per imaged item and not only a merchant basis. Categorization may, as discussed above, be automatically performed by the FMS 331 based on the categorization criteria utilized by the FMS 331, specified or selected by the consumer 315, or based on how other users of the FMS 331 categorize the same or similar items, or changed automatic categorizations of the FMS 331.

Figure 12:
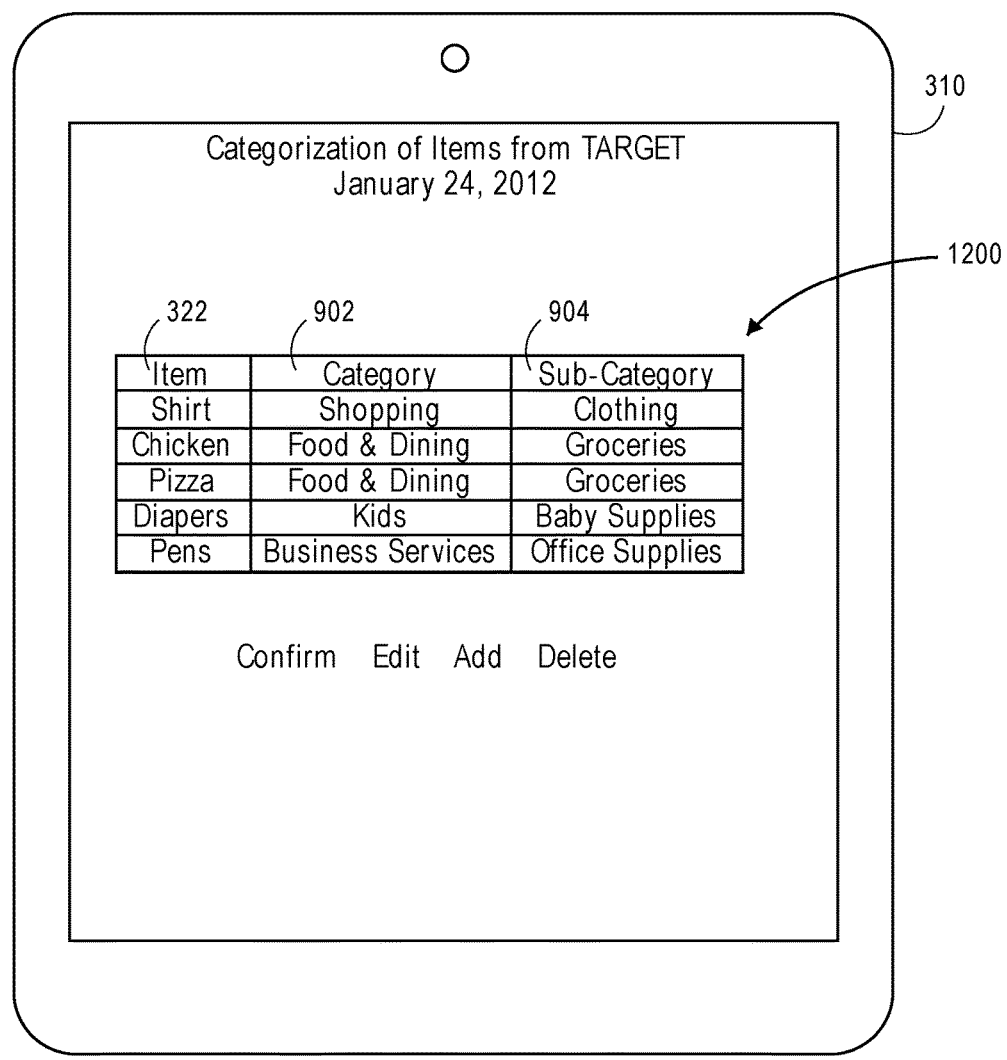
FIG. 12 illustrates an example of how embodiments may present proposed item categorizations to a user or consumer on a screen of a mobile communication device.

For example, as shown in FIG. 12, the FMS application 311 or FMS 331 may generate an interface 1200 for displaying categorization determinations or options to the consumer 315 on the mobile communication device 310 (in embodiments in which categorizations are determined remotely from the mobile communication device 310) to allow the consumer 315 to confirm, edit, add or delete the items that are to be categorized and how such items 322 are categorized. For example, in the illustrated embodiment, the FMS 331 or FMS application 311 has categorized 902 (and sub-categorized 904 as necessary) a "shirt" as "shopping" further categorized "shirt' as "clothing,' "chicken' as "food and dining' and further categorized as "groceries" and "diapers" as "kids" and further categorized as "baby supplies." After these consumer 315 confirmations, the confirmed categorizations 902/904 can be transmitted back to the FMS computer 330. In other embodiments in which categorization is performed remotely on the mobile communication device 310, the interface 1200 can be displayed to the consumer 315 before transmitting the categorization determinations to the remote FMS computer 330.

Figure 13:
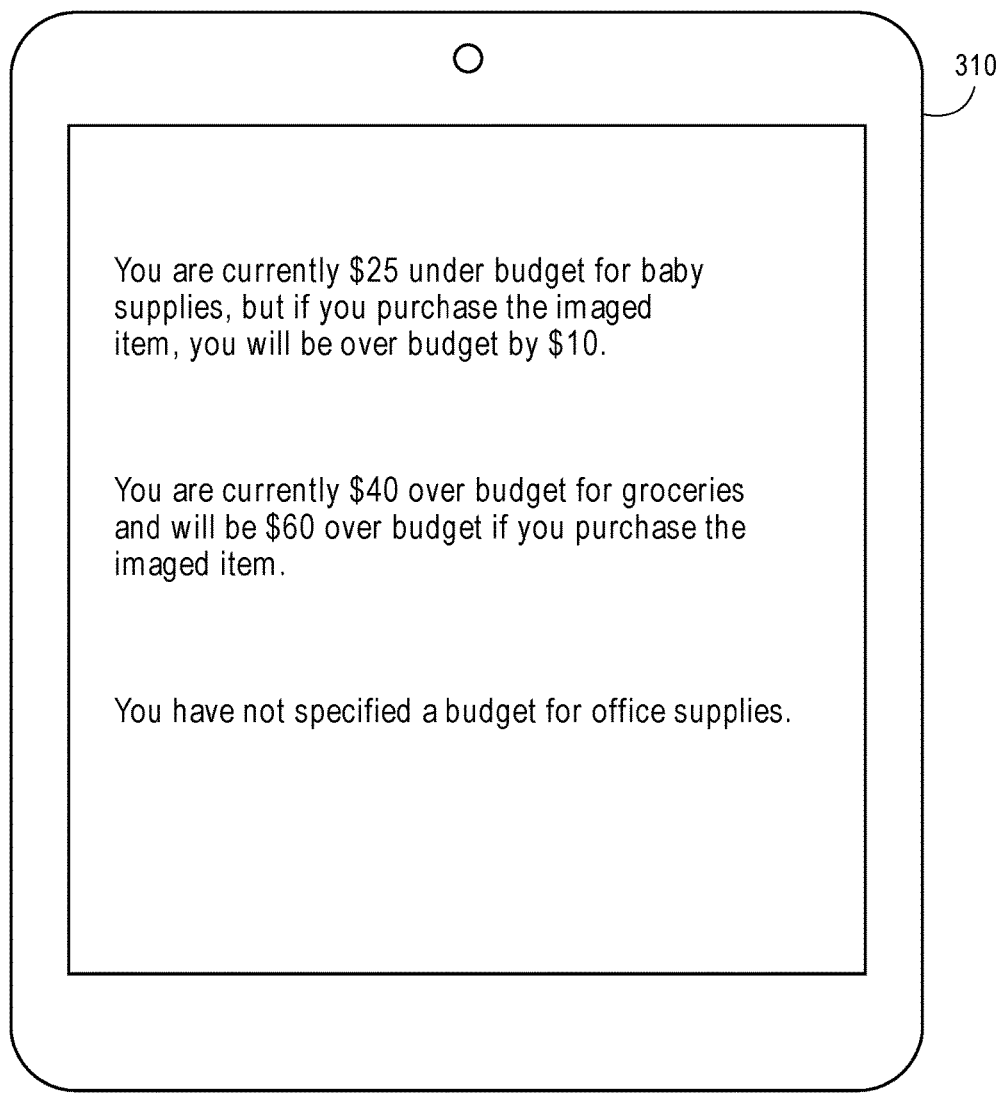
FIG. 13 illustrates an example of how a financial management system may generate a report or summary involving multiple items for display to the user or consumer.
Figure 14:
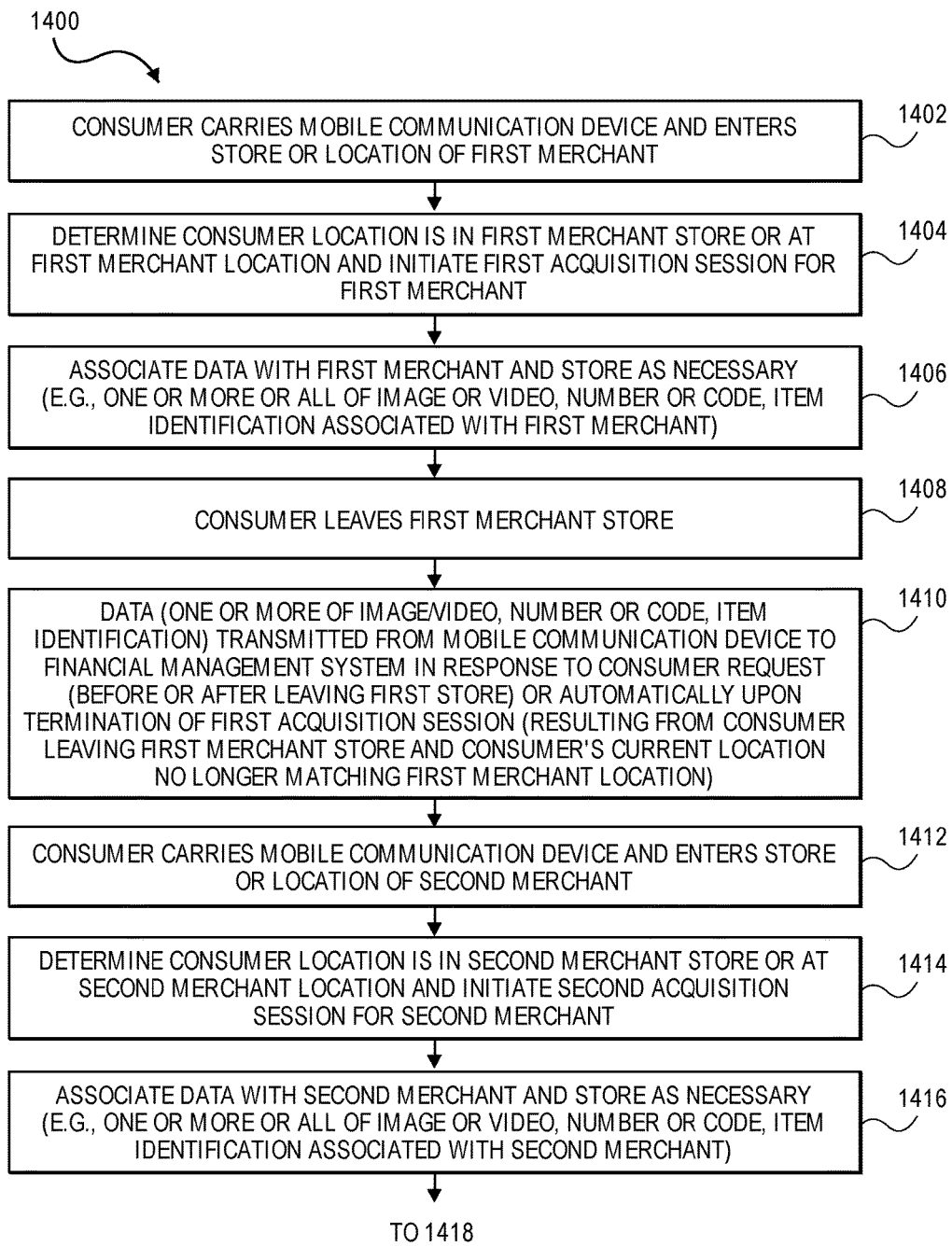
FIG. 14 is a flow diagram of one embodiment of a method for categorization of multiple specific items based on an image or video of an item barcode or other machine readable representation of data associated with the items selected by a user or consumer while at different merchants.
Figure 14:
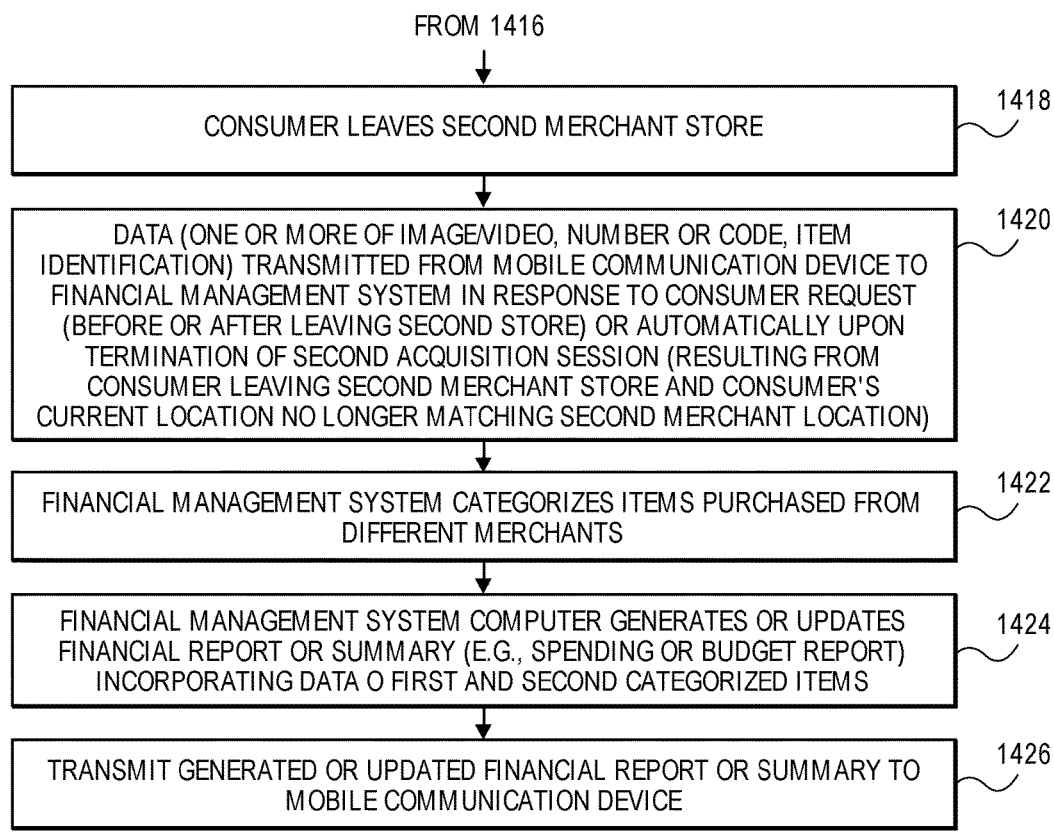
Figure 15:
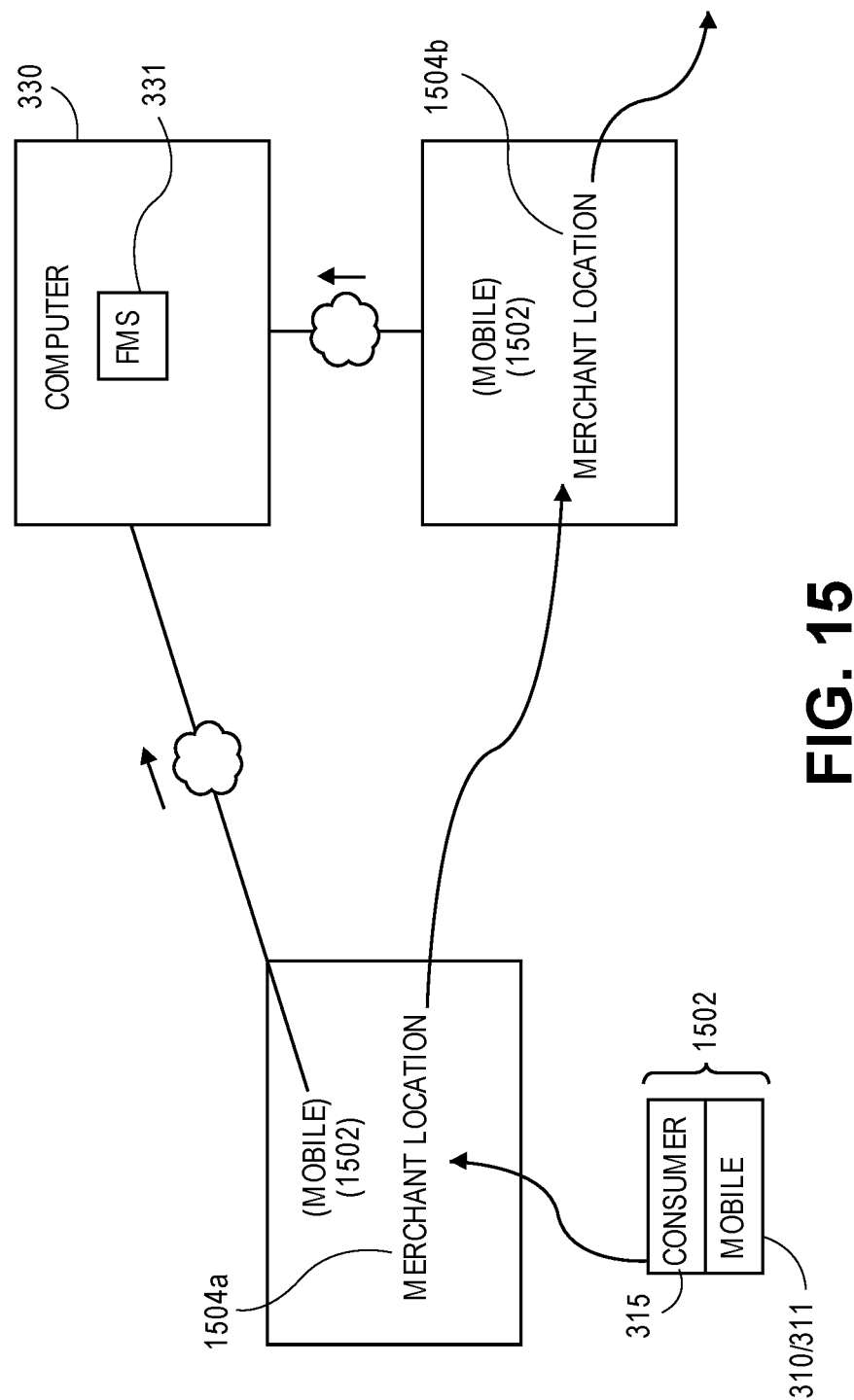
FIG. 15 generally illustrates tracking a consumer's location and initiating an acquisition session for images or video acquired while the user or consumer is at a particular merchant.

Referring again to FIG. 10, and with further reference to FIG. 13, at 1030, the FMS generates or updates a financial report or summary 336 such as a budget or spending report 1300 incorporating data of the first and second categorized items 322a,b and at 1032, may transmit the financial report or summary 1300 to the mobile communication device 310 for display on a screen of the mobile communication device 310. For example, as shown in FIG. 13, information displayed to the consumer 315 may indicate the current consumer budget for that category or the consumer budget assuming the imaged item 322 was purchased. Before or after 1032, the transaction, which may be an electronic transaction involving an electronic payment instrument such as a credit card, debit card or other form of electronic payment, or a cash payment, the merchant 325 and/or FI 345 as necessary process the transaction at 1034, and the FMS 331 eventually receives transaction data from at least one of the consumer 315 (e.g., manually entry or OCR of a receipt) at 1036, directly from the POS terminal 320, and from the FI computer 340, and reconciles, categorizes and incorporates such data into the consumer's account 332 and financial reports or summaries 336 as necessary.

FIGS. 14-17 further illustrate how embodiments may be implemented to categorize different items 322 based on respective images or videos 317 acquired by a consumer 315 using a mobile communication device 310, and how and when such data may be processed and transmitted based at least in part upon the consumer's current location relative to the merchant's location. Various details regarding the embodiments shown in FIGS. 14-17 and described with reference to FIGS. 1-13 are not repeated.

At 1402, the consumer 315 carrying the mobile communication device 310, the current location 1502 of which continues to be tracked by the FMS application 311 via GPS data of the mobile communication device 310, enters a store or location 1504a of a first merchant 325a (as shown by arrow path of consumer 315 carrying mobile communication device 310 with FMS application 311). At 1404, the FMS application 311 determines, e.g., with reference to a database or table of GPS locations, that the consumer 315 is located within the first merchant 325a store or location 1504a (identified by "mobile" in parenthesis), and initiates a first acquisition session for items 322 selected by the consumer 315 while at the first merchant 325a. At 1406, as the consumer 315 acquires images or video 317 of item barcodes 323, the FMS application 311 associates corresponding data with the first merchant 325a and stores the data locally or remotely as necessary (e.g., stores one or more or all of image or video 317, number or code 324, item 322 identification associated with first merchant 325a).

For example, the database or table 1600 shown in FIG. 16 illustrates one example of how the FMS application 311 associates and stores images or video 317 of the barcode 323 acquired with the mobile communication device 310 based on the acquisition sessions for respective merchants 325. In the illustrated embodiment, the table includes columns 1602a-f for data such as the acquisition session, GPS location (and GPS timestamp data if necessary), merchant name or identifier, the image or video 317, the number or code 324 determined or derived from the barcode 323, and the item 322 identification. It will be understood that database or table 1600 is provided as but one example of how embodiments can be implemented. In the illustrated example, the consumer 315 acquired images or video 317a-c of three item barcodes 323a-c from Merchant 1 325a during Acquisition Session 1. The consumer 315 may have selected and purchased the items, or selected the items but did not purchase the items.

At 1408, the consumer 315 carrying the mobile communication device 310 leaves the first merchant 325a location. At 1410, the current location 1502 is tracked by the FMS application 311 via GPS data of the mobile communication device 310, and indicates that the consumer 315 is no longer at the location 1504a of the first merchant 325a, such that the first acquisition session is terminated, and data (one or more of image/video, number or code, item identification) is transmitted from mobile communication device 310 to the FMS 331 in response to consumer 315 request (before or after leaving first merchant 325a) or automatically upon termination of first acquisition session (resulting from consumer 315 leaving first merchant 325a store and consumer's current location 1502 no longer matching location 1504a).

At 1412, the consumer 315 enters a second merchant 325b store or location 1504b, which has a different GPS location than the first merchant location 1504a. At 1414, the FMS application 311 determines, e.g., with reference to a database or table of GPS locations, that the consumer 315 is located at the second merchant location 1504b, and initiates a second acquisition session for items selected by the consumer 315 while at the second merchant 325b. At 1416, as the consumer 315 acquires images or video 317 of item barcodes 322, the FMS application 311 associates corresponding data with the second merchant 325b and stores the data locally or remotely as necessary (e.g., stores one or more or all of image or video, number or code, tem identification associated with first merchant). Thus, the consumer 315 previously acquired images or video 317a-c of three item barcodes 322a-c offered by from Merchant 1 325a during Acquisition Session 1, and the FMS application 311 stores additional images or video 317d-f of other items 322d-f selected by the consumer 315 while at Merchant 2 325b during Acquisition Session 2.

Referring again to FIGS. 14-15, at 1418, the consumer 315 leaves the second merchant location 1504b such that the FMS application 311 detects that the consumer 315 is no longer at the second merchant 325b and terminates the second acquisition session such that the table 1600 is not populated with any further data associated with Merchant 2 325b. At 1420, in response to a user request, or in response to location-based termination of the second acquisition session, data (one or more of image/video 317, number or code 324, item 322 identification) is transmitted from the mobile communication device 310 to the FMS 331 and categorized as described above. Further, as described above, categorization may be performed locally or remotely at the FMS computer 330, and transmission to the FMS 331 may occur before or after leaving the first merchant location 1504a, based on a user request or automatically.

At 1422, the FMS 331 categorizes items purchased from different merchants 325a,b during different acquisition sessions, and at 1424, generates or updates one or more financial reports or summaries 336 (e.g., spending or budget report) incorporating data of one or multiple categorized items 322, which may be transmitted to the mobile communication 310 for display to the consumer 315 at 1426, before or after the consumer 315 leaves a merchant 320 store.

For example, referring to FIG. 17, the FMS 331 categorizes items scanned while the consumer 315 was at a first merchant 325a, separately categorizes items 322 scanned while the consumer 315 was at a second merchant 325b, and separately categorizes items 322 scanned while the consumer 315 was at a third merchant 325c. With embodiments, individual items 322 selected or purchased from a merchant 325 can be separately categorized, and this may be done for each merchant visited by the consumer 315. Thus, rather than having categorization being based on a merchant 325, multiple items 322 purchased from a single merchant can 325 be independently categorized, in real-time before or during a transaction, and such categorization can be performed for other individual items selected or purchased from other merchants 325.

Thus, as shown in FIG. 17, rather than generally categorizing $100 spent at TARGET store or retailer as "shopping," with embodiments, the FMS 331 is able to assign categories 902/904 to individual items 322 for each merchant such as categorizing "shirt" as "shopping" and further categorizing this item as "clothing," merchant such as categorizing A "MOSSIMO shirt" selected at or purchased from TARGET store or retailer as "shopping" and further categorizing this item as "clothing," categorizing "FOSTER FARMS chicken" as "food and dining" and further categorizing this item as "groceries," categorizing "pizza" as "food and dining" and further categorizing this item as "groceries," categorizing "PAMPERS diapers" selected at or purchased from TARGET store or retailer as "kids" and further categorizing this item as "baby supplies," and categorizing this item as "groceries," categorizing "pizza" as "food and dining" and categorizing "pens" selected at or purchased from TARGET store or retailer as "business services" and further categorizing this item as "office supplies," whereas specific items for other merchants are independently categorized based at least in part upon item identification data determined or derived from an image or video including an item barcode. MOSSIMO is a registered trademark of Mossimo Holdings LLC Limited Liability Company, Wilmington, Del., and FOSTER FARMS is a registered trademark of Foster Poultry Farms d.b.a. Foster Farms Corporation, Livingston, Calif. Thus item-level categorization may be performed based on particular items, brands or manufactures, or based on the type of the specific item. Appendix A provides further examples of categories that may be utilized by a FMS 331 and FMS application 311, such as MINT financial management system, and Appendix B provides examples of how these categories 902 may be further categorized to sub-categories 904. The results of such multi-level categorization may be displayed to the consumer 315 in various financial reports and summaries 336.

Figure 18:
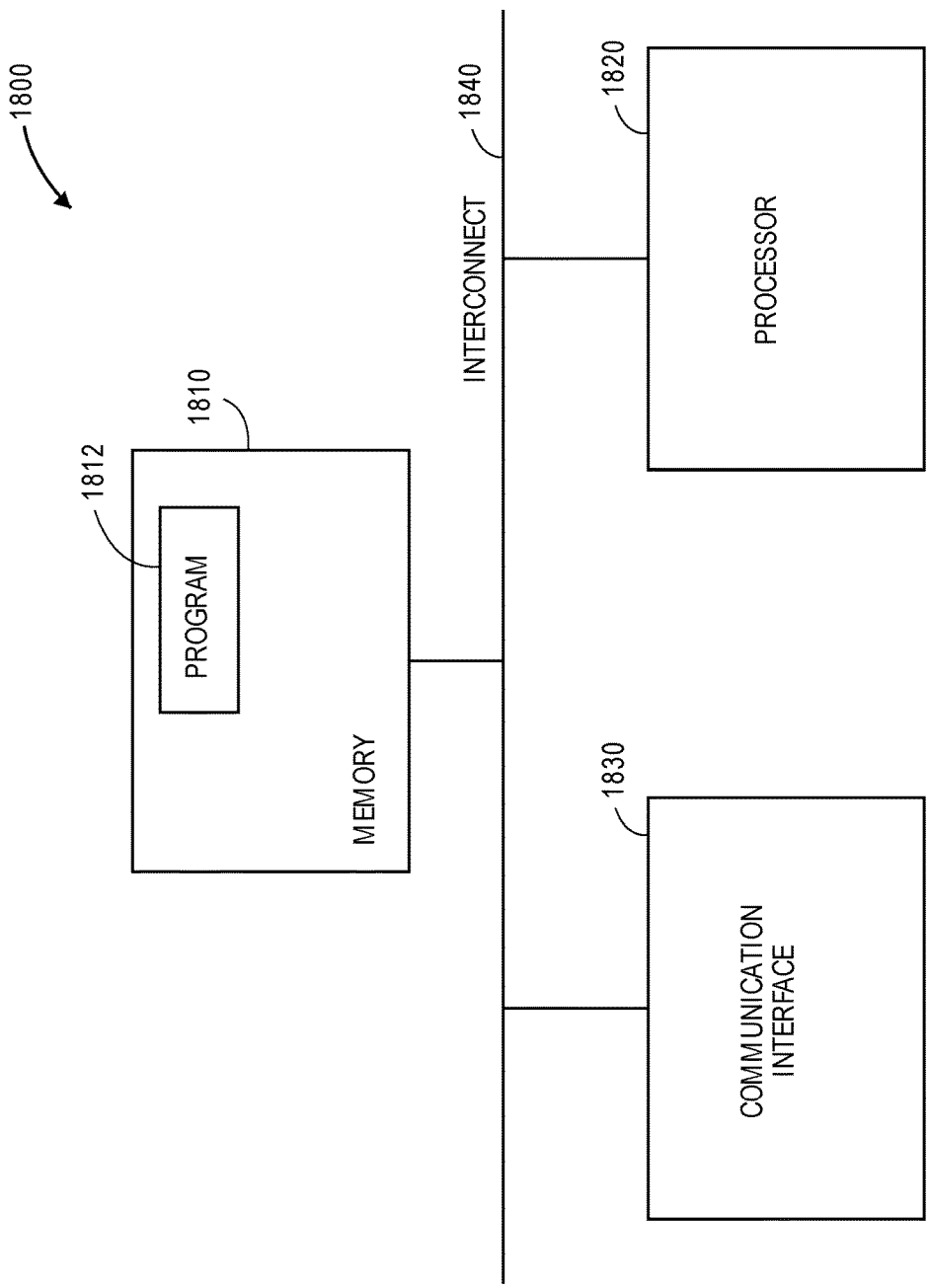
FIG. 18 is a block diagram of components of a computing apparatus or system in which various embodiments may be implemented or that may be utilized to execute embodiments.

FIG. 18 generally illustrates components of a computing device 1800 that may be utilized to execute embodiments and that includes a memory 1810, account processing program instructions 1812, a processor or controller 1820 to execute account processing program instructions 1812, a network or communications interface 1830, e.g., for communications with a network or interconnect 1040 between such components. The memory 1810 may be or include one or more of cache, RAM, ROM, SRAM, DRAM, RDRAM, EEPROM and other types of volatile or non-volatile memory capable of storing data. The processor unit 1820 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1840 may include a system bus, LDT, PCI, ISA, or other types of buses, and the communications or network interface may, for example, be an Ethernet interface, a Frame Relay interface, or other interface. The network interface 1830 may be configured to enable a system component to communicate with other system components across a network which may be a wireless or various other networks. It should be noted that one or more components of computing device 1800 may be located remotely and accessed via a network. Accordingly, the system configuration provided in FIG. 18 is provided to generally illustrate how embodiments may be configured and implemented.

Method embodiments may also be embodied in, or readable from, a non-transitory, computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1820 performs steps or executes program instructions 1812 within memory 1810 and/or embodied on the carrier to implement method embodiments. Further, embodiments may reside and execute on a mobile communication device such as a cellular telephone or smartphone, e.g., as an application that is native or downloaded to a smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference items in the form of goods, embodiments may also involve items in the form of services or both good and services.

Further, while embodiments are described with reference to acquiring an image or video, such image or video may also be received from another source, e.g., a parent may receive the photo or video of an item that a child acquired with their smartphone and wishes to purchase, and the image or video received from the child can be processed with the parent's smartphone to view financial, account, budget and spending summaries for the category of the item contained in the image or video.

Additionally, it will be understood that embodiments may be utilized in conjunction with categorizing items purchased using an electronic payment instrument or with cash, in which case categorization results generated with embodiments assist consumers with manual transaction and category entry as needed. Further, while certain embodiments are described with reference to categorization for financial reports and summaries such as spending summaries, budgets and personal finance goals, embodiments may also be utilized to categorize items in connection with tracking items that are deductible for tax purposes.

Moreover, it will be understood that embodiments may be executed while the consumer is in a merchant store, while the consumer is shopping, while the consumer is in line waiting to purchase an item, after the item has been purchased, and after the consumer has left the merchant store.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. Additionally, it should be understood that steps may be performed by, or under the direction of, a FMS, FMS application or associated computing element or processor, and such steps may be performed concurrently, sequentially and in different orders. For example, transmission from a mobile communication device to a FMS computer may occur while a consumer is shopping, waiting in line, or after a purchase.

Accordingly, embodiments are intended to exemplify alternatives, modifications, and equivalents that may fall within the scope of the claims.

APPENDIX 1

Mint.com Categories
Auto & Transport
Bills & Utilities
Business Services
Education
Entertainment
Fees & Charges
Financial
Food & Dining
Gifts & Donations
Health & Fitness
Home
Income
Kids
Personal Care
Pets
Shopping
Taxes
Transfer
Travel

APPENDIX 2

Mint.com Sub-Categories for Each Category
Category: Auto & Transport
Sub-Categories:
   Auto Insurance
   Auto Payment
   Gas & Fuel
   Parking
   Public Transportation
   Service & Parts
Category: Bills & Utilities
Sub-Categories:

Home Phone
Internet
Mobile Phone
Television
Utilities
Category: Business Services
Sub-Categories:
  Advertising
  Legal
  Office Supplies
  Printing
  Shipping
Category: Education
Sub-Categories:
  Books & Supplies
  Student Loan
  Tuition
Category: Entertainment
Sub-Categories:
  Amusement
  Arts
  Movies & DVDs
  Music
  Newspapers & Magazines
Category: Fees & Charges
Sub-Categories:
  ATM Fee
  Bank Fee
  Finance Charge
  Late Fee
  Service Fee
  Trade Commissions
Category: Financial
Sub-Categories:
  Financial Advisor
  Life Insurance
Category: Food & Dining
Sub-Categories:
  Alcohol & Bars
  Coffee Shops
  Fast Food
  Groceries
  Restaurants
Category: Gifts & Donations
Sub-Categories:
  Charity
  Gift
Health & Fitness
Sub-Categories:
  Dentist
  Doctor
  Eyecare
  Gym
  Health Insurance
  Pharmacy
Category: Home
Sub-Categories:
  Furnishings
  Home Improvement
  Home Insurance
  Home Services
  Home Supplies
  Lawn & Garden
  Mortgage & Rent
Category: Income
Sub-Categories:
  Bonus
  Interest Income
  Paycheck
  Reimbursement
  Rental Income
  Returned Purchase
Category: Kids
Sub-Categories:
  Allowance
  Baby Supplies
  Babysitter & Daycare
  Child Support
  Kids Activities
  Toys
Category: Personal Care
Sub-Categories:
  Hair
  Laundry
  Spa & Massage
Category: Pets
Sub-Categories:
  Pet Food & Supplies
  Pet Grooming
  Veterinary
Category: Shopping
Sub-Categories:
  Books
  Clothing
  Electronics & Software
  Hobbies
  Sporting Goods
Category: Taxes
Sub-Categories:
  Federal Tax
  Local Tax
  Property Tax
  Sales Tax
  State Tax
Category: Transfer
Sub-Categories:
  Credit Card Payment
  Transfer for Cash Spending
Category: Travel
Sub-Categories:
  Air Travel
  Hotel
  Rental Car & Taxi
  Vacation

What is claimed is:

1. A computer-implemented method, comprising:
  a processor or computing element of a mobile communication device
    executing a financial management system application, acquiring a digital image or video of a machine-readable representation of data associated with a specific item offered by a merchant and selected by the consumer before purchase of the specific item by the consumer from the merchant,
    decoding or scanning the machine-readable representation within the digital image or video to determine data comprising a number or code identifying the specific item, and
    determining the specific item selected by the consumer based at least in part upon the determined number or code;
  before purchase of the specific item by the consumer from the merchant, the mobile communication device, by the financial management system application, transmitting identification of the specific item through a network to a computer hosting a financial management system that is linked to an account the consumer has with a financial institution and that is utilized by the consumer to manage the consumer's finances;

the computer, by the financial management system, determining a category of the specific item, determining budget data for the determined category, and transmitting the budget data to the mobile communication device; and the mobile communication device, by the financial management system application, displaying the budget data to the user.

2. The method of claim 1, wherein the specific item is determined by the processor or computing element of the mobile communication device looking up the determined number or code within a table.

3. The method of claim 1, wherein the computer, by the financial management system, looks up the number or code within a table hosted or accessed by the computer hosting the financial management system to categorize the specific item.

4. The method of claim 1, wherein the processor or computing element of the mobile communication device acquires the digital image or video before the consumer leaves the merchant store.

5. The method of claim 4, wherein the processor or computing element of the mobile communication device transmits the machine-readable representation data before the consumer leaves the merchant store.

6. The method of claim 1, further comprising
the mobile communication device acquiring additional digital images or videos of respective machine-readable representations of respective data associated with respective specific items offered by a merchant and selected by the consumer for purchase from the same merchant, the respective digital images or videos being acquired with the mobile communication device before respective specific items are purchased by the consumer;
the mobile communication device, by the financial management system application, transmitting respective machine-readable representation data to the computer hosting the financial management system; and
the computer, by the financial management system, categorizing respective specific items.

7. The method of claim 6, wherein a first specific item is assigned a first category, and a second specific item is assigned a second category different than the first category.

8. The method of claim 6, wherein a first specific item and a second specific item are assigned a first category, and a third specific item is assigned a second category different than the first category.

9. The method of claim 1, further comprising the mobile communication device, by the financial management system application, determining a location of the consumer, wherein the mobile communication device, by the financial management system, transmits the machine readable representation data to the computer based at least in part upon the location of the consumer.

10. The method of claim 9, wherein the mobile communication device, by the financial management system application, transmits the machine-readable representation data to the computer automatically in response to detecting that the consumer has left the merchant store.

11. The method of claim 9, wherein the processor or computing element of the mobile communication device the location of the consumer utilizing global positioning system data of the mobile communication device.

12. The method of claim 1, further comprising the mobile communication device, by the financial management system, determining a location of the consumer, wherein an acquisition session is initiated based at least in part upon the location of the consumer being the merchant store, wherein the image or video is acquired during the acquisition session and associated with the merchant at the merchant store location.

13. The method of claim 1, wherein the specific item is automatically categorized by the financial management system.

14. The method of claim 1, wherein the specific item is categorized based at least in part upon a categorization assigned to the specific item by a plurality of other users of the financial management system.

15. The method of claim 13, wherein the mobile communication device receives and displays the budget data before the specific item is purchased by the consumer.

16. The method of claim 1, wherein the machine-readable representation of data is a one-dimensional barcode, a two-dimensional barcode or a three-dimensional barcode.

17. The method of claim 1, wherein the machine-readable representation of data is a barcode, a matrix or a Quick Response (QR) code.

18. The method of claim 1, wherein the budget data determined by the financial management system and transmitted to the mobile communication device comprises:
current budget data for the determined category, and
hypothetical budget data for the determined category assuming the specific item is purchased by the consumer,
wherein both of the current budget data and the hypothetical budget data are displayed to the user through an interface generated by the financial management system application.

19. The method of claim 1, determining the category of the specific item and budget data and transmitting the budget data to the mobile communication device by the computer are performed before purchase of the specific item by the consumer from the merchant, and wherein displaying the budget data to the user by the mobile communication device is performed before purchase of the specific item by the consumer from the merchant.

20. The method of claim 1, wherein the consumer has purchased the specific item from the merchant, further comprising the computer, by the financial management system, receiving data of a completed transaction for purchase of the specific item from the linked account.

21. A computer-implemented method, comprising:
a mobile communication device
executing a financial management system application,
acquiring a digital image or video of a machine-readable representation of data associated with a specific item offered by a merchant and selected by the consumer before purchase of the specific item by the consumer from the merchant, and
decoding or scanning the machine-readable representation within the digital image or video to determine data comprising a number or code identifying the specific item;
before purchase of the specific item by the consumer from the merchant, the mobile communication device, by the financial management system application,
transmitting machine-readable representation data through a network to a computer hosting a financial management system that is linked to an account the consumer has with a financial institution and that is utilized by the consumer to manage the consumer's finances; and the computer, by the financial management system,
  determining the specific item selected by the consumer based at least in part upon the determined number or code,
  determining a category of the specific item,
  determining budget data for the determined category, and
  transmitting the budget data to the mobile communication device; and the mobile communication device, by the financial management system application, displaying the budget data to the user.

22. The method of claim 21, wherein the computer, by the financial management system, looks up the number or code within a table hosted or accessed by the computer hosting the financial management system to determine the category of the specific item.

23. A computer-implemented method, comprising:
a processor or computing element of a mobile communication device
  executing a financial management system application, and
  acquiring a digital image or video of a machine-readable representation of data associated with a specific item offered by a merchant and selected by the consumer before purchase of the specific item by the consumer from the merchant;
before purchase of the specific item by the consumer from the merchant, the mobile communication device, by the financial management system application, transmitting the digital image or video to a computer hosting a financial management system that is linked to an account the consumer has with a financial institution and that is utilized by the consumer to manage the consumer's finances;
the computer, by the financial management system,
  decoding or scanning the machine-readable representation within the digital image or video to determine data comprising a number or code,
  determining the specific item selected by the consumer based at least in part upon the determined number or code,
  determining a category of the specific item,
  determining budget data for the determined category, and
  transmitting the budget data to the mobile communication device; and
the mobile communication device, by the financial management system application, displaying the budget data to the user.

24. The method of claim 23, the computer, by the financial management system, determining the specific item by looking up the number or code within a table hosted or accessed by the computer.

25. A computer-implemented method, comprising:
a mobile communication device
  executing a financial management system application, and
  acquiring a digital image or video of a machine-readable representation of data associated with a specific item offered by a merchant and selected by the consumer before purchase of the specific item by the consumer from the merchant; and
before purchase of the specific item by the consumer from the merchant, the mobile communication device, by the financial management system application,
  transmitting machine-readable representation data through a network to a computer hosting a financial management system that is linked to an account the consumer has with a financial institution and that is utilized by the consumer to manage the consumer's finances;
the computer, by the financial management system,
  decoding or scanning the machine-readable representation within the digital image or video to determine data comprising a number or code,
  determining the specific item selected by the consumer based at least in part upon the determined number or code,
  determining a category of the specific item,
  determining budget data for the determined category, and
  transmitting the budget data to the mobile communication device;
the mobile communication device, by the financial management system application,
displaying the budget data to the user the mobile communication device
  acquiring additional digital images or videos of respective machine-readable representations of respective data associated with respective specific items offered by a merchant and selected by the consumer for purchase from the same merchant, the respective digital images or videos being acquired with the mobile communication device before respective specific items are purchased by the consumer, and
  transmitting respective machine-readable representation data to the computer hosting the financial management system; and
the computer, by the financial management system, determining respective categories of respective additional specific items.

26. The method of claim 25, wherein a first specific item is assigned a first category, and a second specific item is assigned a second category different than the first category.

27. The method of claim 25, wherein a first specific item and a second specific item are assigned a first category, and a third specific item is assigned a second category different than the first category.

* * * * *